(12) United States Patent
Seki et al.

(10) Patent No.: US 7,763,182 B2
(45) Date of Patent: Jul. 27, 2010

(54) LIQUID CRYSTALLINE COMPOSITION WITH IMPROVED ADHESIVITY, LIQUID CRYSTAL FILM COMPRISING THE COMPOSITION, AND LIQUID CRYSTAL DISPLAY DEVICE EQUIPPED WITH THE FILM

(75) Inventors: Takashi Seki, Yokohama (JP); Hitoshi Mazaki, Yokohama (JP); Takuya Matsumoto, Nagano (JP); Tomoo Hirai, Yokohama (JP)

(73) Assignee: Nippon Oil Corporation, Tokyo (JP)

( * ) Notice: Subject to any disclaimer, the term of this patent is extended or adjusted under 35 U.S.C. 154(b) by 0 days.

(21) Appl. No.: 12/296,801

(22) PCT Filed: Dec. 27, 2006

(86) PCT No.: PCT/JP2006/326386

§ 371 (c)(1),
(2), (4) Date: Oct. 10, 2008

(87) PCT Pub. No.: WO2007/116573

PCT Pub. Date: Oct. 18, 2007

(65) Prior Publication Data

US 2009/0208673 A1     Aug. 20, 2009

(30) Foreign Application Priority Data

Apr. 10, 2006 (JP) .............................. 2006-107903

(51) Int. Cl.
*C09K 19/00* (2006.01)
*C09K 19/06* (2006.01)
*C09K 19/52* (2006.01)

(52) U.S. Cl. .............................. 252/299.6; 252/299.01; 252/299.61; 430/20; 428/1.1; 349/56

(58) Field of Classification Search ............ 252/299.01, 252/299.6, 299.61; 430/20; 428/1.1; 349/56
See application file for complete search history.

(56) References Cited

U.S. PATENT DOCUMENTS

| | | | |
|---|---|---|---|
| 5,064,697 A | 11/1991 | Takiguchi et al. | |
| 5,193,020 A | 3/1993 | Shiozaki et al. | |
| 5,413,657 A | 5/1995 | Yamanashi et al. | |
| 5,773,178 A | 6/1998 | Shiota et al. | |
| 6,210,872 B1 | 4/2001 | Hosaki et al. | |
| 6,660,344 B2 * | 12/2003 | Lub | 428/1.1 |
| 2002/0054262 A1 | 5/2002 | Kitagawa et al. | |
| 2003/0072893 A1 | 4/2003 | Nakano et al. | |
| 2003/0090617 A1 | 5/2003 | Kawamoto et al. | |
| 2004/0209006 A1 | 10/2004 | Matsumoto et al. | |
| 2005/0101752 A1 | 5/2005 | Matsumoto et al. | |
| 2009/0068379 A1 * | 3/2009 | Seki et al. | 428/1.1 |

FOREIGN PATENT DOCUMENTS

| | | |
|---|---|---|
| JP | 3-9326 A | 1/1991 |
| JP | 03-239788 A | 10/1991 |
| JP | 4-57017 A | 2/1992 |
| JP | 5-333313 A | 12/1993 |
| JP | 06-020434 A | 1/1994 |
| JP | 08-278491 A | 10/1996 |
| JP | 09-003454 A | 1/1997 |
| JP | 09-073081 A | 3/1997 |
| JP | 11-080081 A | 3/1999 |
| JP | 11-158258 A | 6/1999 |
| JP | 2000-321426 A | 11/2000 |
| JP | 2001-049205 A | 2/2001 |
| JP | 2002-146353 A | 5/2002 |
| JP | 2002-308832 A | 10/2002 |
| JP | 2003-139953 A | 5/2003 |
| JP | 2004-123597 A | 4/2004 |
| JP | 2004-123882 A | 4/2004 |
| JP | 2004-510785 A | 4/2004 |
| JP | 2004-315736 A | 11/2004 |
| JP | 2006-028428 A | 2/2006 |
| WO | 02/28985 A1 | 4/2002 |

* cited by examiner

*Primary Examiner*—Geraldina Visconti
(74) *Attorney, Agent, or Firm*—Panitch Schwarze Belisario & Nadel LLP

(57) ABSTRACT

The present invention provides a liquid crystal film with improved adhesivity to a tacky adhesive or an adhesive, formed from a liquid crystalline composition comprising a specific (meth)acrylic compound having an oxetane group and a liquid crystalline compound having an oxetane group.

14 Claims, 7 Drawing Sheets

LIQUID CRYSTALLINE COMPOSITION WITH IMPROVED ADHESIVITY, LIQUID CRYSTAL FILM COMPRISING THE COMPOSITION, AND LIQUID CRYSTAL DISPLAY DEVICE EQUIPPED WITH THE FILM

CROSS-REFERENCE TO RELATED APPLICATIONS

This application is a Section 371 of International Application No. PCT/JP2006/326386, filed Dec. 27, 2006, which was published in the Japanese language on Oct. 18, 2007, under International Publication No. WO 2007/116573 A1 and the disclosure of which is incorporated herein by reference.

BACKGROUND OF THE INVENTION

The present invention relates to a liquid crystalline composition with improved adhesivity to tacky adhesives and adhesives, a liquid crystal film comprising such a composition, and a liquid crystal display device equipped with such a film.

In recent years, as a result of the researches and developments which have been actively conducted to apply liquid crystal materials for optical purposes, a liquid crystal film produced by aligning a liquid crystal material and forming the material into a film has been practically used for the purposes of compensating the color and widening the viewing angle, of a liquid crystal display device.

Various methods of forming a liquid crystal material into a film have been known. For example, there is a method in which a liquid crystal film is produced by forming a thin film of a liquid crystal material over a substrate with alignability and then heating the film to a temperature equal to or higher than the glass transition temperature "Tg" so as to align the liquid crystal molecules, followed by quenching the film so as to fix the aligned molecules (see Patent Document Nos. 1 and 2). Alternatively, methods are known in which a film is produced by introducing a cross-linkable group into a liquid crystalline composition and then forming a film thereof over a substrate with alignability, followed by heating the film to a temperature equal to or higher than the Tg to align the liquid crystal molecules and then cross-linking the film by irradiation of light to fix the liquid crystal molecules in the aligned state (see Patent Document Nos. 3 to 6).

These methods can produce aligned films fixed in a liquid crystal alignment state. These films have various structures such as those where a film is kept formed on a substrate (substrate/(alignment film)/aligned film) and those where an aligned film is transferred to a transparent film substrate different from the alignment substrate via a tacky adhesive or an adhesive (transparent film substrate/tacky adhesive or adhesive/alignment film) (see Patent Document Nos. 7 and 8). These aligned films are used in combination with a retardation film or a polarizer via a tacky adhesive or an adhesive, in a liquid crystal display device. As the result of widespread use of liquid crystal display devices, these combined films are required to have properties under severer environments specifically heat resistance under elevated temperature conditions and moisture resistance under elevated humidity conditions. Therefore, adhesivity between an aligned film and a tacky adhesive or an adhesive is strongly required to be high, and various modifications have been studied (see Patent Documents 9 and 10).

The same is applied to a tacky adhesive and an adhesive which are used to transfer an aligned film to a transparent substrate. If such an tacky adhesive or adhesive is insufficient in adhesivity to an aligned film, there would arise a disadvantage that the aligned film may not be sufficiently transferred to another film. Heretofore, there was no particular restriction on tacky adhesives or adhesives used for laminating or transferring as long as they are of optical grades. However, (meth)acrylic tacky adhesives and adhesives have been frequently used because they have wide variety of properties and are easy in handling. As described above, adhesivity between an aligned film formed of a liquid crystal compound and a (meth)acrylic tacky adhesive or adhesive has also been strongly required to be further improved due to the requirements regarding the aforesaid resistance to the environments, of liquid crystal display devices. It is assumed that addition of a (meth)acrylic compound into a film formed of a liquid crystal compound would enhance adhesivity to a (meth)acrylic tacky adhesive or adhesive. However, the influences of addition of the (meth)acrylic compound cause problems that defects in aligning of liquid crystal molecules would likely occur due to an extreme reduction in the alignability of the liquid crystalline composition and heat resistance or moisture resistance would be diminished.

(1) Patent Document No. 1: Japanese Patent Laid-Open Publication No. 3-9326

(2) Patent Document No. 2: Japanese Patent Laid-Open Publication No. 6-20434

(3) Patent Document No. 3: Japanese Patent Laid-Open Publication No. 9-73081

(4) Patent Document No. 4: Japanese Patent Laid-Open Publication No. 2002-146353

(5) Patent Document No. 5: Japanese Patent Laid-Open Publication No. 2002-308832

(6) Patent Document No. 6: Japanese Patent Laid-Open Publication No. 2003-139953

(7) Patent Document No. 7: Japanese Patent Laid-Open Publication No. 4-57017

(8) Patent Document No. 8: Japanese Patent Laid-Open Publication No. 8-278491

(9) Patent Document No. 9: Japanese Patent Laid-Open Publication No. 2000-321426

(10) Patent Document No. 10: Japanese Patent Laid-Open Publication No. 2001-49205

BRIEF SUMMARY OF THE INVENTION

The present invention provides a liquid crystalline composition with high adhesivity to a (meth)acrylic tacky adhesive or adhesive and high liquid crystal alignment retainability even under elevated temperature or humidity conditions, that can solve the aforesaid problems; a liquid crystal film comprising the composition; and a liquid crystal display device equipped with an optical film comprising the liquid crystal film.

That is, according to a first aspect of the present invention, there is provided a liquid crystalline composition comprising a (meth)acrylic compound having an oxetane group represented by any of formulas (1), (2) and (3), and a liquid crystalline compound having an oxetane group:

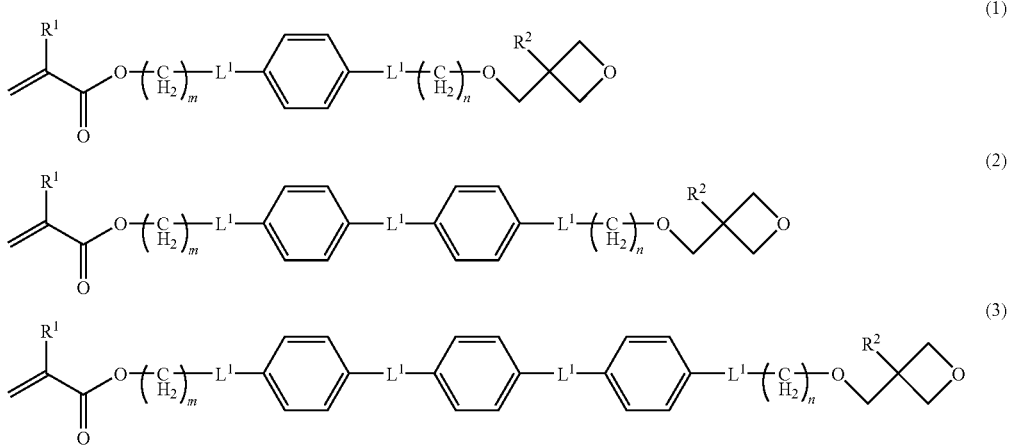

wherein each $R^1$ is hydrogen or methyl, each $R^2$ is hydrogen, methyl, or ethyl, each $L^1$ is a single bond, —O—, —O—CO— or —CO—O—, each m is an integer of 1 to 10, and each n is an integer of 0 to 10.

According to a second aspect of the present invention, there is provided the liquid crystalline composition according to the first aspect, wherein the liquid crystalline compound having an oxetane group is a main chain liquid crystalline polymeric liquid crystalline compound.

According to a third aspect of the present invention, there is provided the liquid crystalline composition according to the first aspect, wherein the liquid crystalline compound having an oxetane group is a side chain liquid crystalline polymeric liquid crystalline compound.

According to a fourth aspect of the present invention, there is provided the liquid crystalline composition according to the first aspect, wherein the liquid crystalline compound having an oxetane group is a side chain liquid crystalline polymer represented by formula (4):

wherein each $R^3$ is hydrogen or methyl, each $R^4$ is hydrogen, methyl, ethyl, butyl, hexyl, octyl, nonyl, decyl, dodecyl, methoxy, ethoxy, propoxy, butoxy, pentyloxy, hexyloxy, heptyloxy, octyloxy, decyloxy, dodecyloxy, cyano, bromo, chloro, fluoro, or carboxyl, each $R^5$ is hydrogen, methyl, or ethyl, $R^6$ is a hydrocarbon group having 1 to 24 carbon atoms, each $L^2$ is a single bond, —O—, —O—CO—, —CO—O—, —CH=CH—, or —C≡C—, p is an integer of 1 to 10, q is an integer of 0 to 10, and a, b, c, d, e, and f are each a molar ratio of each unit in the polymer (a+b+c+d+e+f=1.0 provided that c+d+e≠0).

According to a fifth aspect of the present invention, there is provided the liquid crystalline composition according to any of the first to fourth aspects, further comprising a dioxetane compound represented by formula (5)

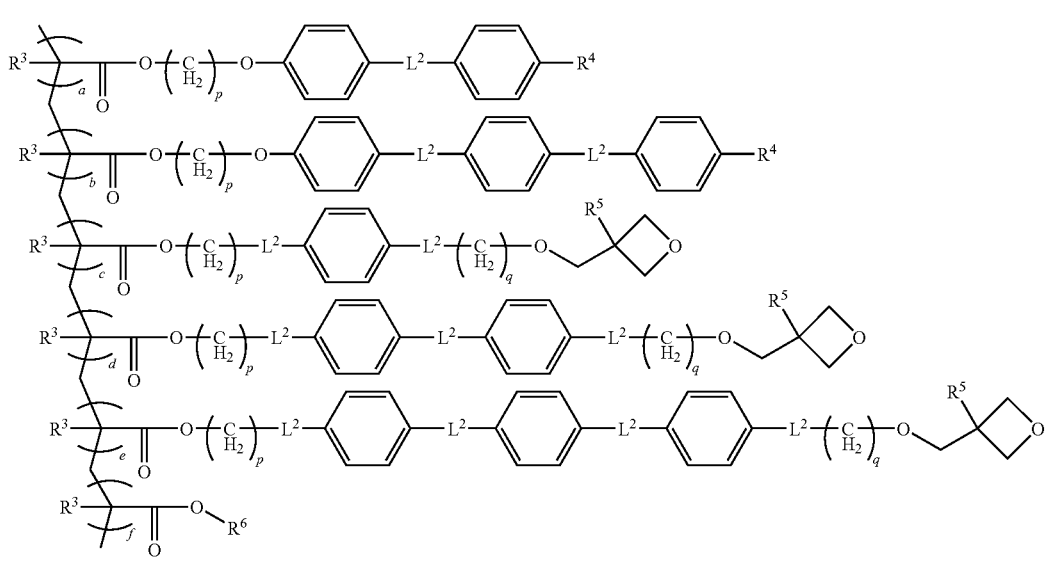

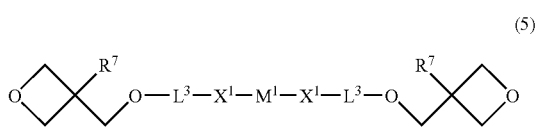

(5)

wherein each $R^7$ is hydrogen, methyl, or ethyl, each $L^3$ is —$(CH_2)_n$— wherein n is an integer of 1 to 12, each $X^1$ is a single bond, —O—, —O—CO—, or —CO—O—, $M^1$ is represented by formula (6) or (7) wherein each $P^1$ is a group selected from those represented by formula (8) and $P^2$ is a group selected from those represented by formula (9), and each $L^4$ is a single bond, —CH=CH—, —C≡C—, —O—, —O—CO—, or —CO—O—

$$—P^1\text{-}L^4\text{-}P^2\text{-}L^4\text{-}P^1— \quad (6)$$

$$—P^1\text{-}L^4\text{-}P^1— \quad (7)$$

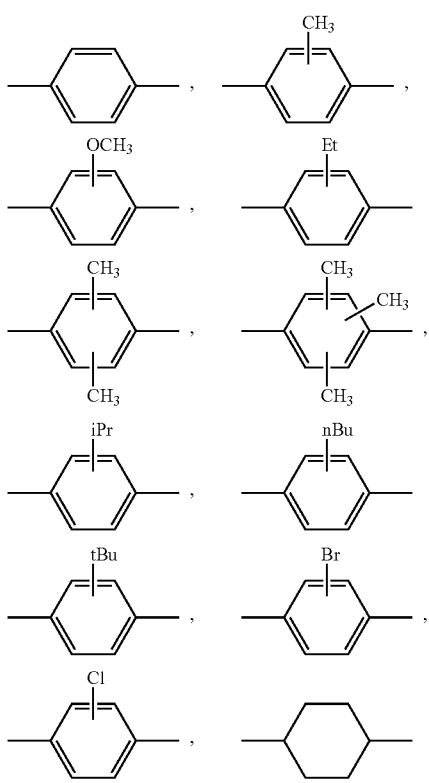

(8)

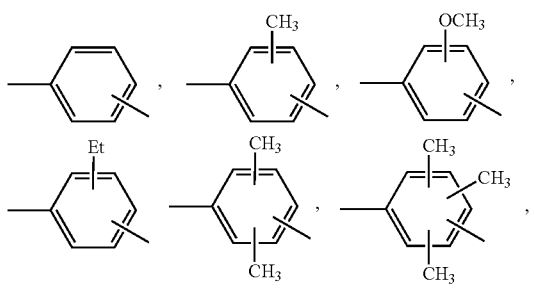

(9)

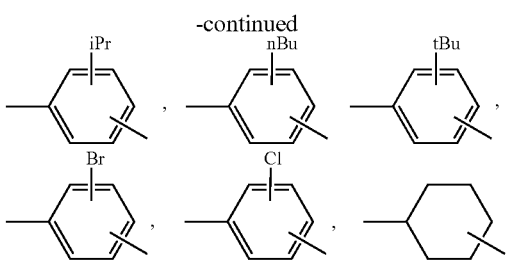

-continued wherein Et, iPr, nBu, and tBu are each ethyl, isopropyl, n-butyl and tert-butyl, respectively.

According to a sixth aspect of the present invention, there is provided the liquid crystalline composition according to any of the first to fifth aspects, wherein the composition (mass ratio) of the compound having an oxetane group represented by any of formulas (1) to (3): the liquid crystalline compound having an oxetane group: the dioxetane compound represented by formula (5) is 1 to 30:100:0 to 40.

According to a seventh aspect of the present invention, there is provided the liquid crystalline composition according to any of the first to sixth aspects, further comprising a photo cation generator and/or a thermal cation generator.

According to an eighth aspect of the present invention, there is provided a liquid crystal film produced by aligning the liquid crystalline composition according to any of the first to seventh aspects, and fixing the composition in the aligned state.

According to a ninth aspect of the present invention, there is provided a process of producing liquid crystal film comprising extending the liquid crystalline composition according to any of the first to seventh aspects over an alignment substrate to be aligned and fixing the composition in the aligned state by photo irradiation and/or heat treatment.

According to a tenth aspect of the present invention, there is provided a liquid crystal film laminate produced by laminating the liquid crystal film according to the eighth aspect via a tacky adhesive or adhesive over another film.

According to an eleventh aspect of the present invention, there is provided a liquid crystal laminate produced by transferring the liquid crystal film according to the eighth aspect via a tacky adhesive or adhesive over an optically transparent film.

According to a twelfth aspect of the present invention, there is provided the liquid crystal film laminate according to the tenth or eleventh aspect, wherein the tacky adhesive or adhesive is an acrylic tacky adhesive or adhesive.

According to a thirteenth aspect of the present invention, there is provided the liquid crystal film according to the eighth aspect, wherein the aligned state is obtained by fixing the composition in an aligned state selected from nematic, twisted nematic, cholesteric, and nematic hybrid orientations.

According to a fourteenth aspect of the present invention, there is provided an optical film comprising the liquid crystal film according to the eighth aspect.

According to a fifteenth aspect of the present invention, there is provided the optical film according to the fourteenth aspect, wherein the film is a retardation film, a color compensation film, a viewing angle improving film, a circular polarizing film, or an optical rotating film.

According to a sixteenth aspect of the present invention, there is provided a liquid crystal display device equipped with the optical film according to the fourteenth or fifteenth aspect.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
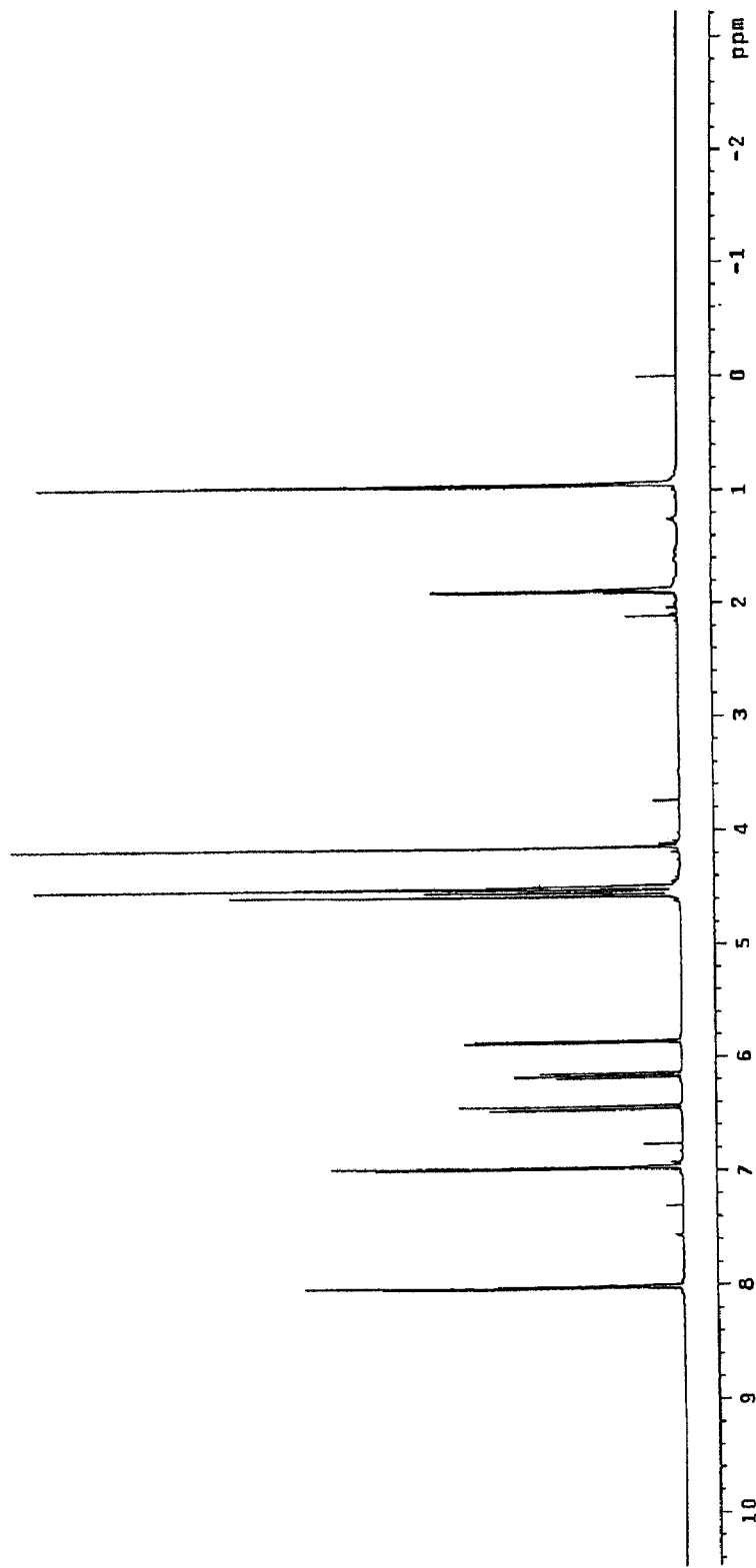
FIG. 1 is the $^1$NMR spectrum of acrylic compound 3. The horizontal line indicates the chemical shift on the basis of tetramethyl silane (TMS) (hereinafter the same).

The present invention will be described in more detail below.

The (meth)acrylic compound having an oxetane group used herein is a compound represented by any of formulas (1) to (3) below:

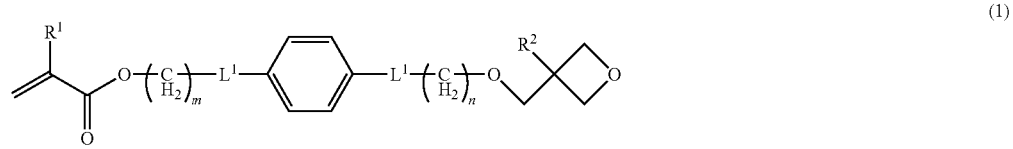

(1)

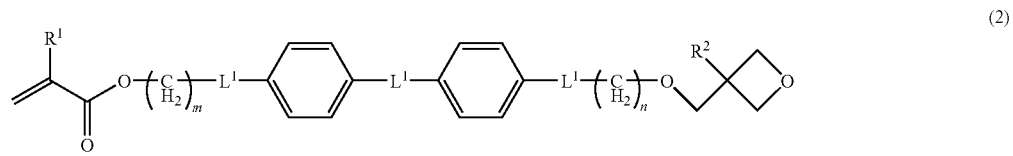

(2)

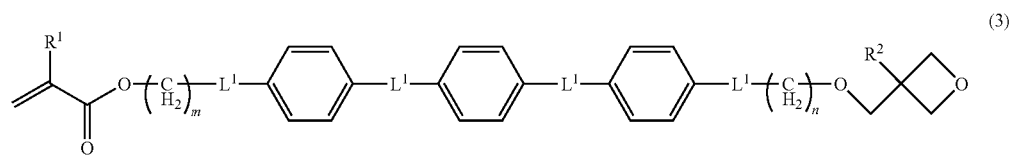

(3)

In formulas (1) to (3), each $R^1$ is hydrogen or methyl, each $R^2$ is hydrogen, methyl, or ethyl, each $L^1$ is a single bond, —O—, —O—CO— or —CO—O—, each m is an integer of 1 to 10, and each n is an integer of 0 to 10.

Various compounds can be exemplified as those represented by formulas (1) to (3) but do not necessarily have liquid crystallinity. Specific examples include the following compounds:

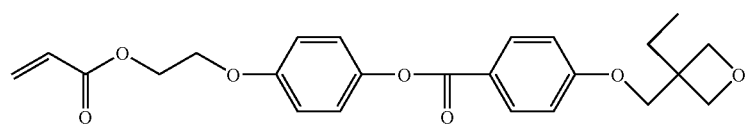

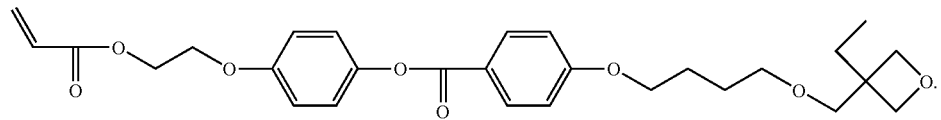

There is no particular restriction on the method of synthesizing these (meth)acrylic compounds having an oxetane group which can, therefore, be synthesized using any of conventional organic synthesis methods.

For example, a portion having an oxetane group is bonded to a portion having a (meth)acrylic group by means of the Williamson's ether synthesis or an ester synthesis using a condensing agent thereby synthesizing a (meth)acrylic compound having two different reactive functional groups, i.e., an oxetane group and a (meth)acrylic group.

During these syntheses, since the oxetane groups have cationic polymerizability, it is necessary to select the reaction conditions with a consideration given to side reactions such as polymerization and ring-opening possibly occurring under strong acid conditions. These reaction conditions will be described in detail with respect to the synthesis of a compound of formula (5) described below.

The liquid crystalline compound having an oxetane group used herein may be a main chain polymeric liquid crystalline compound having an oxetane group or a side chain polymeric liquid crystalline compound having an oxetane group.

Examples of the main chain polymeric liquid crystalline compound having an oxetane group include polyesters, polyesteramides, polyamides, and polyamideimides, that have an oxetane group and exhibit liquid crystallinity. Preferred are polyesters because they can be synthesized at ease.

The main chain liquid crystalline polyesters having an oxetane group used herein are those containing at least two types of units as essential units, selected from an aromatic diol unit (hereinafter referred to as "structural unit A"), an aromatic dicarboxylic acid unit (herein after referred to as "structural unit B") and an aromatic hydroxycarboxylic acid unit (hereinafter referred to as "structural unit C") and containing, in at least one of the terminal ends of the main chain, a structural unit having an oxetane group that is a cationically polymerizable group. These structural units (A), (B) and (C) will be described in this order.

Examples of compounds for introducing structural unit A are compounds represented by the formula below. More specific examples include catechol, resorcin, hydroquinone, substituents of the foregoing compounds, 4,4'-biphenol, 2,2',6,6'-tetramethyl-biphenol, and 2,6-naphthalene diol. Particularly preferred are catechol, resorcin, hydroquinone, and substituents of the foregoing compounds.

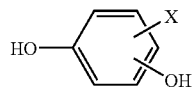

In this formula, —X is —H, —CH$_3$, —C$_2$H$_5$, —CH$_2$CH$_2$CH$_3$, —CH(CH$_3$)$_2$, —CH$_2$CH$_2$CH$_2$CH$_3$, —CH$_2$CH(CH$_3$)CH$_3$, —CH(CH$_3$)CH$_2$CH$_3$, —C(CH$_3$)$_3$, —OCH$_3$, —OC$_2$H$_5$, —OC$_6$H$_5$, —OCH$_2$C$_6$H$_5$, —F, —Cl, —Br, —NO$_2$ or —CN. Particularly preferred are compounds represented by the formula:

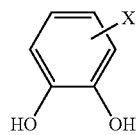

Examples of compounds for introducing structural unit B are compounds represented by the formula below. More specific examples include terephthalic acid, isophthalic acid, phthalic acid, substituents of the foregoing compounds, 4,4'-stilbene carboxylic acid, substituents thereof, 2,6-naphthalene dicarboxylic acid, 4,4'-biphenyl dicarboxylic acid. Particularly preferred are terephthalic acid, isophthalic acid, phthalic acid and substituents of the foregoing compounds.

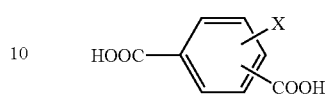

In this formula, —X is —H, —CH$_3$, —C$_2$H$_5$, —CH$_2$CH$_2$CH$_3$, —CH(CH$_3$)$_2$, —CH$_2$CH$_2$CH$_2$CH$_3$, —CH$_2$CH(CH$_3$)CH$_3$, —CH(CH$_3$)CH$_2$CH$_3$, —C(CH$_3$)$_3$, —OCH$_3$, —OC$_2$H$_5$, —OC$_6$H$_5$, —OCH$_2$C$_6$H$_5$, —F, —Cl, —Br, —NO$_2$ or —CN.

Examples of compounds for introducing structural unit C are compounds represented by the formulas below. More specific examples include hydroxybenzoic acid and substituents thereof, 4'-hydroxy-4-biphenylcarboxylic acid and substituents thereof, 4'-hydroxy-4-stilbene carboxylic acid and substituents thereof, 6-hydroxy-2-naphthoic acid, 4-hydroxycinnamic acid. Particularly preferred are hydroxybenzoic acid and substituents thereof, 4'-hydroxy-4-biphenylcarboxylic acid and substituents thereof, and 4'-hydroxy-4-stilbene carboxylic acid and substituents thereof.

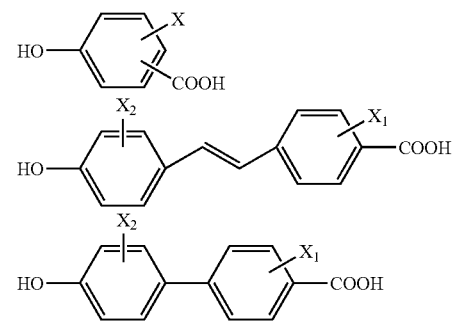

In this formula, —X, —X$_1$, —X$_2$, —Y and —Z are each independently every structural unit —H, —CH$_3$, —C$_2$H$_5$, —CH$_2$CH$_2$CH$_3$, —CH(CH$_3$)$_2$, —CH$_2$CH$_2$CH$_2$CH$_3$, —CH$_2$CH(CH$_3$)CH$_3$, —CH(CH$_3$)CH$_2$CH$_3$, —C(CH$_3$)$_3$, —OCH$_3$, —OC$_2$H$_5$, —OC$_6$H$_5$, —OCH$_2$C$_6$H$_5$, —F, —Cl, —Br, —NO$_2$ or —CN.

The aforesaid main chain liquid crystalline polyesters may be any of those as long as they contain as essential units at least two types selected from (A) aromatic diol unit, (B) aromatic dicarboxylic acid unit and (C) aromatic hydroxycarboxylic acid unit and a structural unit having an oxetane group (hereinafter referred to as "structural unit D") in at least one of the terminal ends of the main chain and exhibit thermotropic liquid crystallinity. There is no particular restriction on other structural units as long as the foregoing are satisfied.

When the ratio of structural units (A), (B) and (C) constituting the main chain liquid crystalline polyester to all the structural units thereof is defined by the ratio of total weight of structural units (A), (B) and (C) in terms of diol, dicarboxylic acid and hydroxycarboxylic acid on the basis of charge amount of all monomers, the ratio is usually from 20 to 90 percent, preferably from 30 to 95 percent, particularly preferably from 40 to 90 percent. When the ratio is smaller than 20 percent, the temperature range where liquid crystallinity is exhibited would likely be narrowed. When the ratio is in excess of 99 percent, the unit having a cationically polymerizable group essential for the main chain liquid crystalline polyester used herein is relatively lessened and thus alignment retainabilty or mechanical strength may not be improved.

Next, structural unit (D) having an oxetane group will be described. Examples of compounds for introducing structural unit D are compounds wherein an oxetane group is bonded to an aromatic compound having a phenolic hydroxyl group or a carboxyl group, as represented by the formulas below. A suitable spacer portion may be present between the aromatic ring and the oxetane group. Alternatively, cationically polymerizable groups other than oxetane group, such as epoxy and vinyloxy groups may be used in combination.

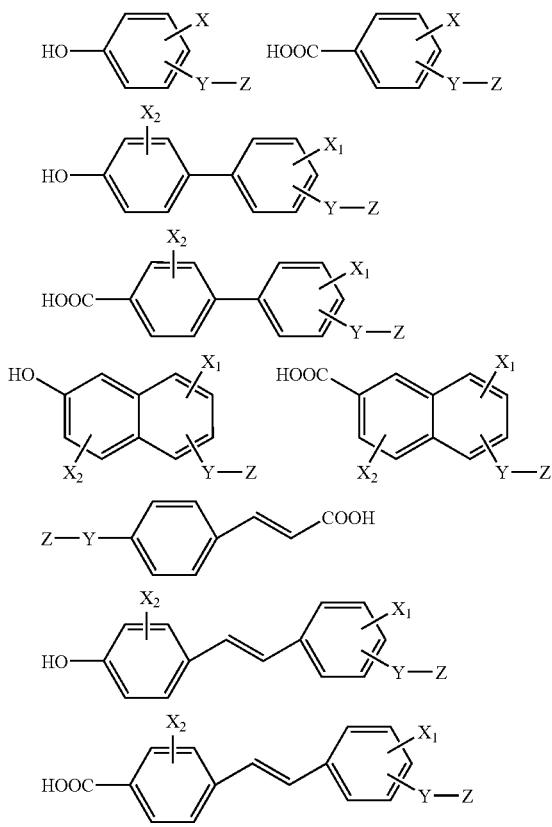

In these formulas, —X, —$X_1$, —$X_2$, —Y and —Z are each independently any of groups below every structural unit:

(1) —X, —$X_1$, —$X_2$: —H, —$CH_3$, —$C_2H_5$, —$CH_2CH_2CH_3$, —$CH(CH_3)_2$, —$CH_2CH_2CH_2CH_3$, —$CH_2CH(CH_3)CH_3$, —$CH(CH_3)CH_2CH_3$, —$C(CH_3)_3$, —$OCH_3$, —$OC_2H_5$, —$OC_6H_5$, —$OCH_2C_6H_5$, —F, —Cl, —Br, —$NO_2$ or —CN;

(2) —Y: single bond, —$(CH_2)_n$—, —O—, —O—$(CH_2)_n$—, —$(CH_2)_n$—O—, —O—$(CH_2)_n$—O—, —O—CO—, —CO—O—, —O—CO—$(CH_2)_n$—, —CO—O—$(CH_2)_n$—, —$(CH_2)_n$—O—CO—, —$(CH_2)_n$—CO—O—, —O—$(CH_2)_n$—O—CO—, —O—$(CH_2)_n$—CO—O—, —O—CO—$(CH_2)_n$—O—, —CO—O—$(CH_2)_n$—O—, —O—CO—$(CH_2)_n$—O— CO—, —O—CO—$(CH_2)_n$—CO—O—, —CO—O—$(CH_2)_n$—O—CO— or —CO—O—$(CH_2)_n$—CO—O— (n is an integer of 1 to 12); and (3) Z:

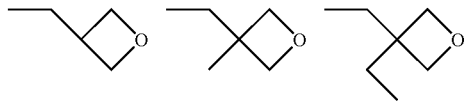

Among these structural units (D), preferred are those wherein the substituent having an oxetane group and the phenolic hydroxyl group or carboxylic acid group has a positional relation of 1,4-position if bonded to the benzene ring, a positional relation of 2,6-position if bonded to the naphthalene ring and a positional relation of 4,4'-position if bonded to the biphenyl or stilbene in view of liquid crystallinity. Specific examples include 4-vinyloxy benzoic acid, 4-vinyloxy phenol, 4-vinyloxyethoxy benzoic acid, 4-vinyloxyethoxy phenol, 4-glycidyloxy benzoic acid, 4-glycidyloxy phenol, 4-(oxetanylmethoxy)benzoic acid, 4-(oxetanylmethoxy)phenol, 4'-vinyloxy-4-biphenyl carboxylic acid, 4'-vinyloxy-4-hydroxybiphenyl, 4'-vinyloxyethoxy-4-biphenyl carboxylic acid, 4'-vinyloxyethoxy-4-hydroxybiphenyl, 4'-glycidyloxy-4-biphenyl carboxylic acid, 4'-glycidyloxy-4-hydroxybiphenyl, 4'-oxetanylmethoxy-4-biphenyl carboxylic acid, 4'-oxetanylmethoxy-4-hydroxybiphenyl, 6-vinyloxy-2-naphthalene carboxylic acid, 6-vinyloxy-2-hydroxynaphthalene, 6-vinyloxyethoxy-2-naphthalene carboxylic acid, 6-vinyloxyethoxy-2-hydroxynaphthalene, 6-glycidyloxy-2-naphthalene carboxylic acid, 6-glycidyloxy-2-hydroxynaphthalene, 6-oxetanylmethoxy-2-naphthalene carboxylic acid, 6-oxetanylmethoxy-2-hydroxynaphthalene, 4-vinyloxy cinnamic acid, 4-vinyloxyethoxy cinnamic acid, 4-glycidyloxy cinnamic acid, 4-oxetanylmethoxy cinnamic acid, 4'-vinyloxy-4-stilbene carboxylic acid, 4'-vinyloxy-3'-methoxy-4-stilbene carboxylic acid, 4'-vinyloxy-4-hydroxystilbene, 4'-vinyloxyethoxy-4-stilbene carboxylic acid, 4'-vinyloxyethoxy-3'-methoxy-4-stilbene carboxylic acid, 4'-vinyloxyethoxy-4-hydroxystilbene, 4'-glycidyloxy-4-stilbene carboxylic acid, 4'-glycidyloxy-3'-methoxy-4-stilbene carboxylic acid, 4'-glycidyloxy-4-hydroxystilbene, 4'-oxetanylmethoxy-4-stilbene carboxylic acid, 4'-oxetanylmethoxy-3'-methoxy-4-stilbene carboxylic acid, and 4'-oxetanylmethoxy-4-hydroxystilbene.

When the ratio of structural units (D) constituting the main chain liquid crystalline polyester to all the structural units thereof is defined by the ratio of total weight of structural units (D) in terms of carboxylic acid or phenol on the basis of the charge composition, the ratio is usually from 1 to 60 percent, preferably from 5 to 50 percent. When the ratio is smaller than 1 percent, alignment retainabilty or mechanical strength may not be improved. When the ratio is in excess of 60 percent, the temperature range where liquid crystallinity is exhibited would likely be narrowed because the liquid crystallinity is enhanced.

Although each of structural units (A) to (D) has one or two carboxyl group or phenolic hydroxyl group, it is desirous that the equivalent numbers of the functional groups of the carboxyl groups or phenolic hydroxyl groups of structural units (A) to (D) are substantially equalized at the stage of charging thereof. That is, when structural unit (D) is a unit having a free carboxyl group, it desirously satisfies a relation defined by (the number of moles of (A)×2)=(the number of moles of (B)×2)+(the number of moles of (D)). When structural unit (D) is a unit having a free phenolic hydroxyl group, it desirously satisfies a relation defined by (the number of moles of (A)×2)+(the number of moles of (D))=(the number of moles of (B)×2). When the charge composition deviates largely from these relations, it is not preferable because carboxylic acid, phenol, or derivatives thereof other than units involved with cationic polymerization would become a molecular terminal, resulting not only in insufficient cationic polymerizability but also in the occurrence of polymerization reaction or decomposition at stages other than those desired in a process due to the presence of these acid residuals.

The main chain liquid crystalline polyester may contain structural units other than (A), (B), (C) and (D). There is no particular restriction on such structural units, which, therefore, may be any compound (monomer) that has been used in this field. Examples of such structural units include naphthalene dicarboxylic acid, biphenyl dicarboxylic acid, aliphatic dicarboxylic acids and these compounds with a halogen group or an alkyl group introduced therein, and biphenol, naphthalene dioil, aliphatic diol and these compounds with a halogen group or an alkyl group introduced therein. The use of optically active compounds as raw materials for units constituting the main chain liquid crystalline polyester renders it possible to impart the polyester with a chiral phase. There is no particular restriction on such optically active compounds. Examples of such compounds include optically active aliphatic alcohols ($C_nH_{2n+1}OH$ wherein n is an integer of 4 to 14), alkoxybenzoic acids to which an optically active aliphatic group is bonded ($C_nH_{2n+1}O$—Ph—COOH wherein n is an integer of 4 to 14 and Ph is a phenyl group), menthol, camphoric acid, naproxen derivatives, binaphthol, 1,2-propanediol, 1,3-butanediol, 2-methylbutanediol, 2-chlorobutanediol, tartaric acid, methylsuccinic acid, 3-methyladipic acid, isosorbide, and isomannide.

The molecular weight of the main chain liquid crystalline polyester defined by inherent viscosity η measured at 30° C. in a phenol/tetrachloroethane (60/40 weight ratio) solvent is preferably from 0.03 to 0.50 dl/g, more preferably from 0.05 to 0.15 dl/g. If η is smaller than 0.03 dl/g, the viscosity of a solution of the main chain liquid crystalline polyester would be low and thus a uniform film thereof may not be produced upon film formation. If η is greater than 0.50 dl/g, alignability would be diminished because a temperature at which an alignment treatment is carried out would be higher and thus aligning and polymerization would likely occur simultaneously.

The molecular weight of the main chain liquid crystalline polyester is mainly controlled with the charge composition. Specifically, the average polymerization degree of the resulting main chain liquid crystalline polyester (average bonding number of structural units (A) to (D)) is determined with the relative content of a monofunctional monomer reacting to seal the both molecular terminals, i.e., the above-described compound for introducing structural unit (D) in the total charge composition. Therefore, it is necessary to adjust the charge composition depending on the type of charged monomer in order to obtain a main chain liquid crystalline polyester with a desired inherent viscosity.

There is no particular restriction on the method of synthesizing the main chain type liquid crystalline polyester since there may be employed any method usually used for synthesizing polyesters. For example, there may be employed a method in which a carboxylic acid unit is activated in acid chloride or sulfonic acid anhydride and reacted with a phenol unit in the presence of a base (acid chloride method), in which a carboxylic acid unit and a phenol unit are directly condensed using a condensing agent such as DCC (dicyclohexylcarbodiimide), or in which a phenol unit is acetylated and deacetylation-polymerized, together with a carboxylic acid unit under a molten state. However, since in the case of using deacetylation-polymerization under a molten state, there is a risk that the monomer unit having an oxetane group undergoes polymerization or decomposition unexpectedly under the reaction conditions, there frequently arises a necessity to control the reaction conditions strictly. Furthermore, under particular circumstances, it may be desired to employ a method wherein a suitable protection group is used or wherein after a compound having a different functional group is brought into a reaction, an oxetane group is introduced. Alternatively, the crude main chain type liquid crystalline polyester produced by polymerization may be refined by recrystallization or reprecipitation.

The main chain liquid crystalline polyester produced as described may be subjected to an analysis such as NMR (nuclear magnetic resonance) to identify in what ratio each monomer is present in the polyester. In particular, the average bonding number of the main chain liquid crystalline polyester can be calculated from the mass ratio of the oxetane group.

Alternatively, a side chain polymeric liquid crystalline compound may be used in place of the above-described main chain polymeric liquid crystalline compound. Examples of such a side chain polymeric liquid crystalline compound include polymeric liquid crystalline compounds represented by formula (4) below:

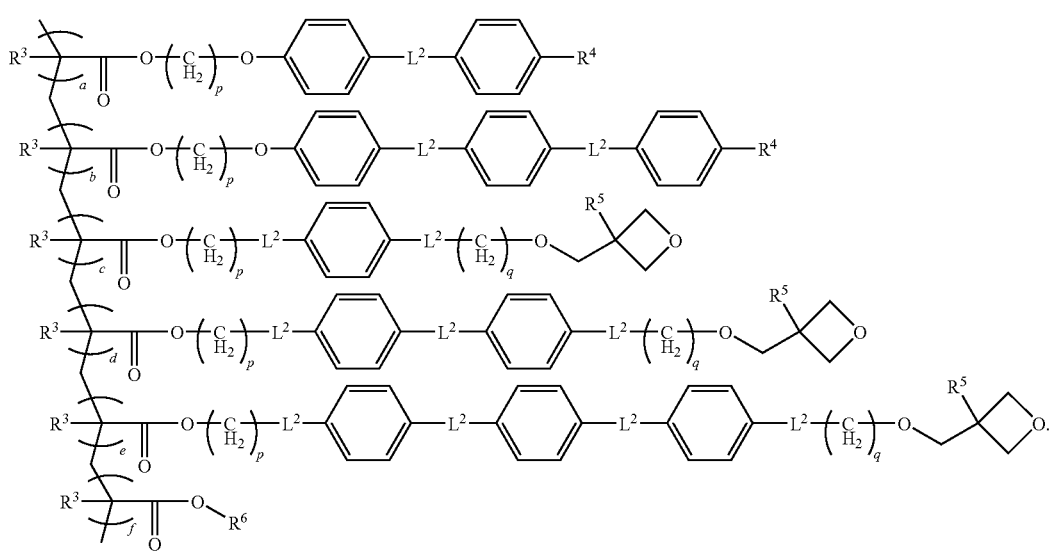

(4)

In formula (4), each $R^3$ is hydrogen or methyl, each $R^4$ is hydrogen, methyl, ethyl, butyl, hexyl, octyl, nonyl, decyl, dodecyl, methoxy, ethoxy, propoxy, butoxy, pentyloxy, hexyloxy, heptyloxy, octyloxy, decyloxy, dodecyloxy, cyano, bromo, chloro, fluoro, or carboxyl, each $R^5$ is hydrogen, methyl, or ethyl, $R^6$ is a hydrocarbon group having 1 to 24 carbon atoms, each $L^2$ is a single bond, —O—, —O—CO—, —CO—O—, —CH=CH—, or —C≡C—, p is an integer of 1 to 10, q is an integer of 0 to 10, and a, b, c, d, e, and f are each a molar ratio of each unit in the polymer (a+b+c+d+e+f=1.0 provided that c+d+e≠0).

The molar ratio of each unit constituting the side chain polymeric liquid crystalline compound is necessarily defined by "a+b+c+d+e+f=1.0" provided that "c+d+e≠0" and the compound necessarily exhibits liquid crystallinity. The molar ratio of each unit may be arbitrarily selected as long as these requirements are satisfied but is preferably as follows:

a: preferably from 0 to 0.80, more preferably from 0.05 to 0.50;
b: preferably from 0 to 0.90, more preferably from 0.10 to 0.70;
c: preferably from 0 to 0.50, more preferably from 0.10 to 0.30;
d: preferably from 0 to 0.50, more preferably from 0.10 to 0.30
e: preferably from 0 to 0.50, more preferably from 0.10 to 0.30; and
f: preferably from 0 to 0.30, more preferably from 0.01 to 0.10.

$R^4$ is preferably hydrogen, methyl, butyl, methoxy, cyano, bromo, or fluoro, particularly preferably hydrogen, methoxy, or cyano. $L^2$ is preferably a single bond, —O—, —O—CO— or —CO—O—.

$R^6$ is preferably a hydrocarbon having 2, 3, 4, 6, 8 or 18 carbon atoms.

The side chain polymeric liquid crystalline compound varies in birefringence index depending on the ratio of a to f of each component or alignment form. The birefringence index of the compound if aligned in a nematic orientation is preferably from 0.001 to 0.300, more preferably from 0.05 to 0.25.

The side chain polymeric liquid crystalline compound may be synthesized at ease by radically or anionically polymerizing the (meth)acrylic group of each (meth)acrylic compound corresponding to each of the components. There is no particular restriction on the conditions of polymerization. Therefore, conventional conditions may be employed.

As an example of radical polymerization, a method may be used in which a (meth)acrylic compound corresponding to each component is dissolved in a solvent such as dimethylformamide (DMF) or diethylene glycol dimethyl ether and reacted at a temperature of 60 to 120° C. for several hours using 2,2'-azobisisobutylonitrile (AIBN) or benzoyl peroxide (BPO) as an initiator. Alternatively, in order to allow a liquid crystal phase to be stably exhibited, there is an effective method in which living radical polymerization is carried out using an initiator such as a copper (I) bromide/2,2'-bipyridyl-based initiator or a 2,2,6,6-tetramethylpiperidinyloxy free radical (TEMPO)-based initiator so as to control the molecular weight distribution. These radical polymerizations are needed to be carried out strictly in the absence of oxygen.

As an example of the anionic polymerization, a method may be used in which a (meth)acrylic compound corresponding to each component is dissolved in a solvent such as tetrahydrofuran (THF) and reacted using a strong base such as an organic lithium compound, an organic sodium compound or the Grignard reagent as an initiator. Alternatively, this polymerization can be converted to living anionic polymerization by optimizing the initiator or reaction temperature thereby controlling the molecular weight distribution. These anionic polymerizations are needed to be carried out strictly under dehydration and deoxidation conditions.

The weight average molecular weight of the side chain polymeric liquid crystalline compound is preferably from 1,000 to 200,000, particularly preferably from 3,000 to 50,000.

The liquid crystalline composition of the present invention preferably comprises a dioxetane compound represented by the formula

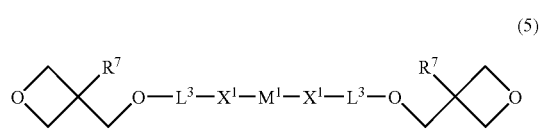

(5)

wherein each $R^7$ is hydrogen, methyl, or ethyl, each $L^3$ is —(CH$_2$)$_n$— wherein n is an integer of 1 to 12, each $X^1$ is a single bond, —O—, —O—CO—, or —CO—O—, $M^1$ is represented by formula (6) or (7) below wherein each $P^1$ is a group selected from those represented by formula (8) below and $P^2$ is a group selected from those represented by formula (9), and each $L^4$ is a single bond, —CH=CH—, —C≡C—, —O—, —O—CO—, or —CO—O—

(6)

(7)

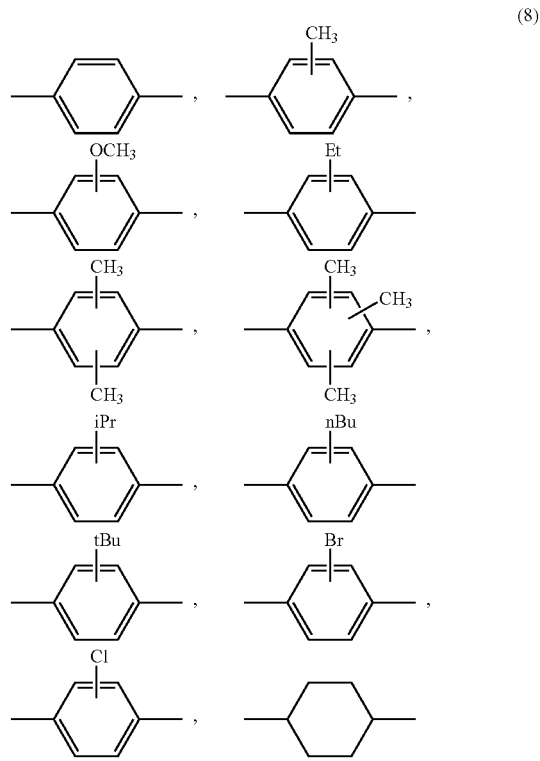

(8)

-continued

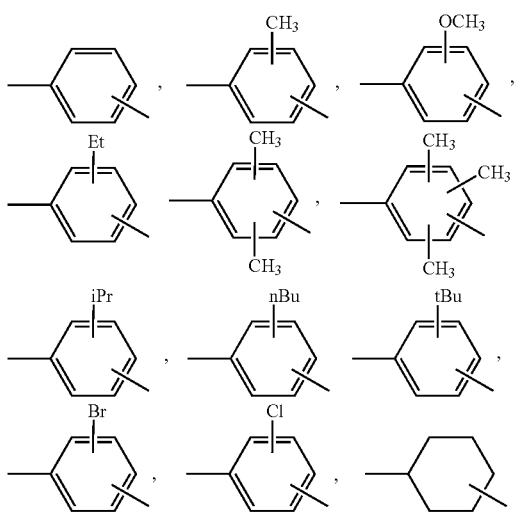

(9)

In formulas (8) and (9), Et, iPr, nBu, and tBu are each ethyl, isopropyl, n-butyl and tert-butyl, respectively.

More specifically, the dioxetane compound has interconnecting groups coupling the $M^1$ group to the oxetane groups positioned on the right and left sides thereof which interconnecting groups may be different from one another (asymmetric) or the same (symmetric) and may not exhibit liquid crystallinity although the liquid crystallinity varies depending on the structure.

There are many compounds that can be exemplified as compounds represented by formula (5) because of variation in combination of $L^3$, $X^1$, Y and $M^1$. However, preferable examples include the following compounds:

to induce such side reactions, compared with oxylane group, which is though a similar cationically polymerizable functional group. Furthermore, since the oxetane group may allow various compounds similar thereto, such as alcohols, phenols, and carboxylic acids to react with one another, the use of protection groups may be considered if necessary.

More specific examples of the synthesis methods include those wherein hydroxybenzoic acid used as the starting material is bonded to oxetane groups with, for example, the Williamson ether synthesis and then the resulting compound is bonded to a diol suitable for the present invention with an acid chloride method or condensation with carbodiimide and wherein hydroxybenzoic acid is condensed with a diol suitable for the present invention after the hydroxyl group is protected with an appropriate protection group and then the hydroxyl group is reacted with a proper oxetane compound such as haloalkyloxetane after the protection group is desorbed.

Reaction between the oxetane compound and the hydroxyl group may be carried out under suitable conditions selected depending on the configuration or reactivity of the compounds to be used. Generally, the reaction temperature is from −20 to 180° C., preferably from 10 to 150° C. while the reaction time is from 10 minutes to 48 hours, preferably from 30 minutes to 24 hours. Ranges other than the foregoing ranges are not preferable because the reaction would not proceed sufficiently or a side reaction would occur. The mixing ratio of the oxetane compound and the hydroxyl group is preferably from 0.8 to 1.2 equivalent of oxetane compound per equivalent of hydroxyl group.

The reaction may be carried out without using a solvent but is usually carried out in the presence of a solvent. There is no particular restriction on the solvent as long as it does not bother the intended reaction. Examples of the solvent include aromatic hydrocarbons such as benzene, toluene and xylene; amides such as dimethylformamide, dimethylacetoamide and

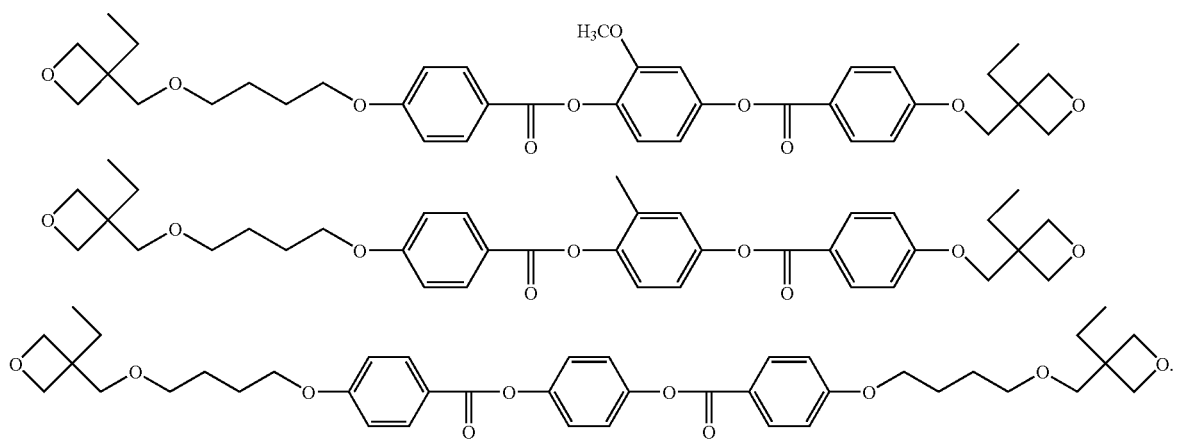

There is no particular restriction on the method of synthesizing these compounds because they can be synthesized in accordance with any conventional method utilized in the field of organic chemistry.

During these syntheses, since the oxetane groups have cationic polymerizability, it is necessary to select the reaction conditions with a consideration given to side reactions such as polymerization and ring-opening possibly occurring under strong acid conditions. The oxetane groups are less potential N-methylpyrorridone; ketones such as methyl ethyl ketone and methyl isobutyl ketone; ethers such as dibutyl ether, ethylene glycol dimethyl ether and diethylene glycol dimethyl ether; esters such as ethyl acetate and ethyl benzoate; and mixtures thereof.

The compounds represented by formulas (1) to (3) and (5) may be refined by recrystallization or column chromatography if necessary. Recrystallization is effective particularly for compounds of a rather high crystallinity. Even if the compound can not be recrystallized at ordinary temperature, it may be able to be recrystallized after being cooled to a lower temperature of such as −20° C.

In the liquid crystalline composition of the present invention, the composition (mass ratio) of the compound having an oxetane group represented by any of formulas (1) to (3): the liquid crystalline compound having an oxetane group: the dioxetane compound represented by formula (5) added if necessary is 1 to 30:100:0 to 40, preferably 3 to 20:100:5 to 30. Ranges deviating this range are not preferable because adhesivity between the liquid crystalline composition and a tacky adhesive or an adhesive would be insufficient, or the resulting liquid crystal film would be fragile.

After the liquid crystalline composition is aligned, it is fixed in a liquid crystal state by polymerizing the cationically polymerizable group contained therein to be cross-linked. Whereby, the resulting liquid crystal film is improved in heat resistance. Therefore, the liquid crystalline composition preferably contains a photo cation generator and/or a thermal cation generator, capable of generating cations by applying an external stimulus such as light and/or heat in order to allow easily the cationic polymerization to proceed rapidly. If necessary, various sensitizing agents may be used in combination.

As used herein, the term "photo cation generator" denotes a compound which can generate cations by irradiation of a light with a specific wavelength and may be any of organic sulfonium salt-, iodonium salt-, or phosphonium salt-based compounds. Counter ions of these compounds are preferably antimonate, phosphate, and borate. Specific examples include $Ar_3S^+SbF_6^-$, $Ar_3P^+BF_4^-$, and $Ar_2I^+PF_6^-$ wherein Ar indicates a phenyl or substituted phenyl group. Alternatively, sulfonic acid esters, triazines, diazomethanes, β-ketosulfones, iminosulfonates, and benzoinsulfonates may also be used.

The term "thermal cation generator" used herein denotes a compound which can generate cations by heating to a certain temperature and may be any of benzylsulfonium salts, benzylammonium salts, benzylpyridinium salts, benzylphosphonium salts, hydrazinium salts, carbonic acid esters, sulfonic acid esters, amineimides, antimony pentachloride-acetyl chloride complexes, diaryliodonium salt-dibenzyloxy coppers, and halogenated boron-tertiary amine adducts.

Since the amount of the cation generator to be added to the liquid crystalline composition varies depending on the structures of mesogen or spacer portion constituting the main chain or side chain liquid crystalline polymer to be used, the equivalent weight of the oxetane group or the conditions of aligning the liquid crystalline composition, it can not be determined with certainty. However, the amount is within the range of usually 100 ppm by mass to 20 percent by mass, preferably 1,000 ppm by mass to 10 percent by mass, more preferably 0.5 percent by mass to 8 percent by mass, and most preferably 1 percent by mass to 6 percent by mass on the basis of the mass of the main chain or side chain liquid crystalline polymer. An amount of the cation generator of less than 100 ppm by mass is not preferable because polymerization may not progress due to the insufficient amount of cation to be generated. An amount of the cation generator of more than 20 percent by mass is not also preferable because a large amount of the undecomposed residue of the cation generator is likely to remain in the liquid crystal film and may cause the light resistance to degrade.

The liquid crystalline composition of the present invention may contain various compounds that can be mixed without impairing liquid crystallinity, other than the above-described main chain or side chain polymeric liquid crystalline compound. Examples of such compounds include compounds having a cationically polymerizable functional group such as oxetane, epoxy and vinyloxy groups and various polymers having film-forming capability.

Next, description will be given of a process of making a liquid crystal film with the liquid crystalline composition of the present invention. The process is not restricted to that described below, but the liquid crystal film may be produced by extending the liquid crystalline composition over an alignment substrate to be aligned and fixing the composition in the aligned state by photo irradiation and/or heat treatment.

First, the liquid crystalline composition of the present invention is extended over an alignment substrate to be aligned. Examples of such an alignment substrate include films of polyimide, polyphenylene sulfide, polyphenylene oxide, polyetherketone, polyethylene naphthalates, polyethylene terephthalates, polyarylates, and triacetyl cellulose. Some of these films exhibit a sufficient alignability for the liquid crystalline composition of the present invention and can be used as alignment substrates as they are, depending on the method of producing the films. However, many of them are used after being treated by rubbing, stretching, polarized light irradiation or oblique light irradiation to exhibit or be strengthened in alignability. It is also possible to allow these films to exhibit alignability by providing on the films a known alignment film of polyimide, polyvinylether, polyvinylcinnamate or polyvinyl alcohol and then treating them by rubbing, stretching, polarized light irradiation or oblique light irradiation. An oblique vapor deposition with silicon oxide may also be used. These treatments may be used in combination.

Examples of methods of extending the liquid crystalline composition on an alignment substrate to from a liquid crystalline composition layer include those wherein the liquid crystalline composition in a molten state is directly coated on an alignment substrate and wherein a solution of the liquid crystalline composition is coated on an alignment substrate and the coated film is dried to evaporate the solvent.

There is no particular restriction on the solvent used for preparing a solution of the liquid crystalline composition of the present invention as long as it can dissolve the components constituting the composition and various compounds that may be added if necessary and can be evaporated under appropriate conditions. Preferable examples of the solvent include ketones such as acetone, methyl ethyl ketone, isophorone and cyclohexanone; ether alcohols such as butoxy ethyl alcohol, hexyloxy ethyl alcohol, and methoxy-2-propanol; glycol ethers such as ethylene glycol dimethylether and diethylene glycol dimethyl ether; ester-based solvents such as ethyl acetate, ethyl lactate and γ-butyrolactone; phenol-based solvents such as phenol and chlorophenol; amide-based solvents such as N,N-dimethylformamide, N,N-dimethylacetoamide, and N-methylpyrrolidone; halogen-based solvents such as chloroform, tetrachloroethane, and dichlorobenzene; and mixtures thereof. These solvents may be used alone or in combination. Examples of the above-mentioned various compounds include surfactants, defoaming agents, or leveling agents that may be added to the solution so as to form a uniform film layer on an alignment substrate. Since the amount of these various compounds varies depending on the structure or composition ratio of components constituting the liquid crystalline composition, it can not be determined with certainty. However, the amount is usually on the order of 0.01 percent by mass to 10 percent by mass.

There is no particular restriction on the coating method as long as the uniformity of the film layer can be maintained no matter whether the composition is directly coated on a substrate or a solution of the composition is coated thereon. Therefore, there may be used any conventional method such as spin coating, die coating, curtain coating, dip coating, or roll coating methods.

The liquid crystalline composition layer may be in the form wherein it is coated in a single alignment substrate, i.e., the layer surface may be exposed to the air or in the form wherein it is covered with another substrate after removing the solvent to be sandwiched between the two substrates. The another substrate may not be necessarily the same as the first substrate.

Coating of a solution of the liquid crystal material is preferably followed by a drying step for removal of the solvent after coating. There is no particular restriction on the drying step as long as it can maintain the uniformity of the coated film, which may be any conventional method. For example, there may be used a method using a heater (furnace) or a hot air blowing.

Since the thickness of the coated film is adjusted depending on the liquid crystalline composition to be used or the application of the resulting liquid crystal film, it can not be determined with certainty. However, the thickness after dried is from 0.05 to 20 µm, preferably from 0.2 to 10 µm. When the liquid crystalline composition of the present invention is aligned, it exhibits refractive index anisotropy. Therefore, it is not necessarily sufficient to determine the thickness of the coated film only with the thickness and thus it is sometimes preferable to determine the thickness with a retardation value ($\Delta$nd=refractive index anisotropy ($\Delta$n)×film thickness (d)), depending on the aligned state of the composition. In this case, the retardation value is from 10 to 1000 nm, preferably from 20 to 800 nm. A film thickness and/or retardation value deviating these ranges are not preferable because exhibition of the intended effects would be difficult or the composition would be aligned insufficiently.

Next, the liquid crystalline composition layer formed on the alignment substrate is aligned in a liquid crystal state by a heat treatment or the like and then cured by photo-irradiation and/or a heat treatment so as to be fixed in the liquid crystal state. The first heat treatment is carried out so as to align the composition in a liquid crystal state by its self-alignability by heating the liquid crystalline composition layer to the range of temperatures at which the composition exhibits a liquid crystal phase. Since the conditions for the heat treatment vary in optimum conditions and limits depending on the liquid crystal phase behavior temperature (transition temperature) of the liquid crystalline composition to be used, it can not be determined with certainty. However, the heat treatment is conducted at a temperature within the range of usually 10 to 250° C., preferably 30 to 160° C., more preferably at a temperature higher than the glass transition temperature (Tg) of the liquid crystalline composition, more preferably at a temperature higher by 10° C. or higher than the Tg of the liquid crystalline composition. Too low temperatures are not preferable because there is a possibility that the composition would not be aligned in a liquid crystal state sufficiently, while too high temperatures are not also preferable because cationically polymerizable groups in the liquid crystalline composition would be adversely affected. The heat treatment is conducted for usually 3 seconds to 30 minutes, preferably 10 seconds to 10 minutes. A heat treatment for shorter than 3 seconds is not preferable because there is a possibility that the composition may not be aligned in a liquid crystal phase completely. Whereas, a heat treatment for longer than 30 minutes is not also preferable because the productivity is extremely deteriorated.

Examples of alignment that the composition can exhibit by heat treatment include nematic, twisted nematic, cholesteric, and nematic hybrid alignments. When the composition is aligned in a twisted nematic or cholesteric alignment, an optically active compound is needed. The optically active compound may be separately added to or incorporated as a copolymerizable (condensation) component in the main chain or side chain polymeric liquid crystalline compound. There is no particular restriction on the optically active compound. Examples of the compound include optically active aliphatic alcohols ($C_nH_{2n+1}$OH wherein n is an integer of 4 to 14), alkoxybenzoic acids to which an optically active aliphatic group is bonded ($C_nH_{2n+1}$O—Ph—COOH wherein n is an integer of 4 to 14 and Ph is a phenol group), menthol, camphoric acid, naproxen derivatives, binaphthol, 1,2-propanediol, 1,3-butanediol, 2-methylbutanediol, 2-chlorobutanediol, tartaric acid, methylsuccinic acid, 3-methyladipic acid, isosorbide, and isomannide.

Among these compounds, preferred are binaphthol, isosorbide, and isomannide because they are more effective even though they are added in a less amount.

After the liquid crystalline composition layer is subjected to a heat treatment or the like to be aligned in a liquid crystal state, it is cured by polymerization of the cationically polymerizable reactive groups in the composition while being maintained in the liquid crystal state. This curing process is carried out so as to fix the layer in the liquid crystal state thus formed by a curing (cross-linking) reaction thereby modifying the layer to be harder.

As described above, since the liquid crystalline composition of the present invention has a cationically polymerizable reactive group, it is preferable to use a cationic polymerization initiator (cation generator) for polymerizing (cross-linking) the reactive group. As such a polymerization initiator, a photo-cation generator is preferred to a thermal-cation generator.

In the case of using a photo-cation generator, after addition thereof, the processes up to the thermal treatment for aligning the liquid crystalline composition are carried out under such dark conditions (conditions where light is shielded to an extent that the photo-cation generator does not dissociate) that the liquid crystalline composition does not cure until subjected to the aligning process and thus can be aligned while maintaining sufficient flowability. Thereafter, a light from a light source capable of emitting an appropriate wavelength of light is irradiated so as to allow the photo-cation generator to generate cations thereby curing the liquid crystalline composition layer.

The light irradiation is carried out by irradiating the liquid crystalline composition with a light from a light source having a spectrum in an absorption wavelength region of the photo-cation generator to be used, such as a metal halide lamp, a high-pressure mercury lamp, a low-pressure mercury lamp, a xenon lamp, an arc discharge lamp, and a laser thereby decomposing the photo-cation generator. The irradiation dose per cm2 is within the range of generally 1 to 2,000 mJ, preferably 10 to 1,000 mJ in the integrated irradiation dose. However, when the absorption region of the photo-cation generator is extremely different from the spectrum of the light source, or the liquid crystal material itself can absorb a light in the wavelength of the light source, the irradiation dose is not limited to the above range. In these cases, a method may be employed in which a suitable photo sensitizer or two or more kinds of photo-cation generators having different absorption wavelengths are used.

The temperature upon irradiation of light needs to be within the range wherein the liquid crystalline composition is aligned in a liquid crystal state. Furthermore, the light irradiation is preferably carried out at a temperature which is equal to or higher than the Tg of the liquid crystalline composition, in order to enhance sufficiently the efficiency of the curing.

The liquid crystalline composition layer produced through the above-described steps becomes a sufficiently solid and strong film. More specifically, since the three-dimensional bond of the mesogen portion is achieved by the curing reaction, the liquid crystalline composition layer is significantly improved not only in heat-resistance (the upper limit temperature at which the liquid crystal alignment is maintained) but also in mechanical strength such as resistance to scratch, wear, and cracking. The present invention is of great significance in the industrial sense because it can achieve the directly-opposed purposes, i.e., easy control of a liquid crystal alignment that must be precise and improvements in the thermal/mechanical strength, at the same time.

The liquid crystalline composition layer (liquid crystal film) fixed in a liquid crystal alignment can be used as an optical film in the form in which the layer remains supported on the alignment substrate (alignment substrate/(alignment layer)/liquid crystalline composition layer); in the form in which the film is transferred to a transparent substrate film or the like other than the alignment substrate (transparent substrate film/liquid crystalline composition layer); or in the form of a single layer of the liquid crystalline composition layer.

The liquid crystal film may be used, attached to other film. Examples of the other film include various liquid crystal-aligned films such as polarizing elements, polarizers and the liquid crystal film of the present invention, various optical films produced by stretching plastic films such as polycarbonates, polyesters and cycloolefin polymers, and optically transparent films described below.

The optically transparent film to which the liquid crystal film of the present invention is transferred may be any film as long as it is transparent in a wavelength region where the liquid crystal film or optical film of the present invention is intended to be used. Examples of the optically transparent film include triacetyl cellulose films such as Fujitac (manufactured by Fuji Photo Film Co., Ltd.) and Konicatac (manufactured by Konica Corp.); transparent films such as TPX film (manufactured by Mitsui Chemical Inc.), Arton film (manufactured by JSR), Zeonex film (manufactured by Zeon Corp.), and Acryplene film (manufactured by Mitsubishi Rayon Co., Ltd.); and polyethylene terephthalate films treated with silicone or provided on its surface with a releasable layer. If necessary, various optical glasses, quartz glasses or polarizers may be used.

There is no particular restriction on the tacky adhesive or adhesive to be used to attach or transfer the liquid crystal optical film as long as it is of optical grade. Therefore, there may be used conventional acrylic-, epoxy resin-, ethylene-vinyl acetate copolymer-, rubber-, urethane-based adhesives, mixture types thereof, or various reactive adhesives of such as thermal curing type and/or photo curing type or electron radiation curing types. Preferred are photo curing type tacky adhesives or adhesives because they can be handled easily.

Radically polymerizable and cationically polymerizable types are known as photo-curing type tacky adhesives and adhesives. In the present invention, it is preferable to use tacky adhesives and adhesives comprising mainly a compound having a (meth)acryloyl group, that are of radically polymerizable type (hereinafter referred to as "acrylic tacky adhesive and adhesive"). The acrylic tacky adhesive and adhesive may be any of conventionally available ultraviolet (UV) curing type tacky adhesives and adhesives and those suitably modified depending on the adhesivity of the liquid crystalline composition.

The modification depending on the adhesivity of the liquid crystalline composition is carried out by adding appropriately additives such as photo-polymerization initiators, viscosity modifiers (thickner), surface active agents and dispersants to oligomers such as various (meth)acrylic monofunctional monomers or polyfunctional monomers, commercially available from TOAGOSEI Co., Ltd. and OSAKA ORGANIC CHEMISTRY LTD., polyester(meth)acrylates, and polyurethane(meth)acrylates. Further, (fine) particles having a different refractive index from the acrylic tacky adhesive and adhesive may be added to diffuse or scatter light. Examples of materials for the (fine) particles include silica, alumina, ITO, silver and various (cross-linked) plastics.

Since the amount of the (fine) particles varies depending on their types, components or functions, it can not be determined with certainty. However, the amount is preferably from 0.01 to 20 percent by mass of the acrylic tacky adhesive and adhesive.

The reaction (curing) conditions under which the reactive tacky adhesives or adhesives are cured vary depending on their formulation, viscosity and reaction temperature thereof. Therefore, the curing may be carried out under the conditions properly selected. For acrylic tacky adhesive and adhesives, it may be cured at a similar irradiation dose using a similar light source to those used for the above-described photo cation generator. Electron radiation curing type adhesives may be cured at an accelerating voltage of usually 10 kV to 200 kV, preferably 25 kV to 100 kV.

The method of transferring the liquid crystalline composition layer may be any conventional method. For example, as disclosed in Japanese Patent Laid-Open Publication Nos. 4-57017 and 5-333313, a method may be used in which after an intended substrate different from the alignment substrate is laminated via a tacky adhesive or adhesive over a liquid crystal film layer on an alignment substrate and if necessary then cured (UV cross-linking), only the liquid crystal film is transferred on the intended substrate by releasing the alignment substrate.

APPLICABILITY IN THE INDUSTRY

The liquid crystal film of the present invention may be used as various types of optical films. Among such optical films, those fixed in a nematic or twisted nematic alignment can be used compensation films for STN, TN, OCB and HAN types transmissive or reflective liquid crystal display devices. Such optical films fixed in a cholesteric alignment can be used as polarizing reflective films reflective type color films for enhancing brightness, and security devices and various decoration films utilizing color changes of reflected light at viewing angle caused by selective reflectivity. Such optical films fixed in a nematic hybrid alignment can be used as viewing angle improving films for TN type liquid crystal display devices, utilizing a retardation upon viewing from the front or the asymmetric nature caused by the orientation of retardation value (inclination of the film). Furthermore, those having a function as a ¼ wavelength plate when used in combination with a polarizer can be used as anti-glare filters for reflection type liquid crystal displays and EL display devices.

EXAMPLES

The present invention will be further described in the following examples, but the present invention should not be construed as being limited thereto.

The analyzing methods used in the examples are as follows.

(1) ¹H-NMR Measurement

A compound was dissolved in deuterated chloroform or deuterated dimethylsulfoxide, and the ¹H-NMR was determined with "INOVA 400" manufactured by VARIAN Co., Ltd.

(2) Observation of Liquid Crystal Phase Behavior

Liquid crystal phase behavior was observed using a polarizing microscope "Olympus BH2" while heating a sample on a hot stage "FP82HT" manufactured by Mettler-Toledo International Inc.

Phase transition temperature was measured using a differential scanning calorimeter "DSC7" manufactured by Perkin Elmer Co.

Regarding the description of phase behavior, "C" indicates crystal phase, "Ch" indicates cholesteric phase, "Nm" indicates nematic phase, and "Iso" indicates isotropic liquid phase.

(3) Measurement of Inherent Viscosity of Polymeric Liquid Crystalline Compound

Inherent viscosity was measured in a mixed solvent of phenol/tetrachloroethane (60/40 weight ratio) at a temperature of 30° C. using an Ubbelohde viscometer.

(4) Parameter Measurement of Optical Film

The retardation (Δnd) of an aligned liquid crystalline composition or the like was measured by irradiating it with a 550 nm wavelength light using "KOBRA-21ADH" manufactured by Oji Scientific Instrument Co., Ltd. The average tilt angle of a nematic hybrid alignment was determined by measuring Δnd from −40 to 40 degrees incremented by 10 degrees through a simulation wherein the tilt angle is assumed to change in a linear form.

(5) Measurement of GPC

GPC measurement was carried out by dissolving compounds in tetrahydrofuran and using 8020 GPC system manufactured by TOSOH CORPORATION equipped with TSK-GEL, Super H1000, Super H2000, Super H3000, and Super H4000 which are connected in series and tetrahydrofuran as an eluent solvent. Polystyrene was used as a standard for calibration of the molecular weight.

(6) Measurement of Film Thickness

The thickness of a film was measured using SURFACE TEXTURE ANALYSIS SYSTEM Dektak 3030ST manufactured by SLOAN Co. A method was also used in which the film thickness was determined by interference measurement ("Ultraviolet Visible Near-Infrared Spectrophotometer V-570" manufactured by JASCO Corporation) and refractive index data.

The abbreviations used in the following Reference Examples, Examples and Comparative Examples are as follows:

DCC: 1,3-dicyclohexylcarbodiimide
DMAP: 4-dimethylaminopyridine
DCM: dichloromethane
PPTS: pyridinium-p-toluene sulfonate
THF: tetrahydrofuran
DMF: dimethylformamide
BHT: 2,6-di-t-butyl-4-methylphenol
PEN: polyethylene naphthalate
TAC: triacetyl cellulose Reference Example 1

Synthesis of Intermediate Compound 1 Having an Oxetane Group

In accordance with Scheme 1 below, an intermediate compound 1 having an oxetane group was synthesized.

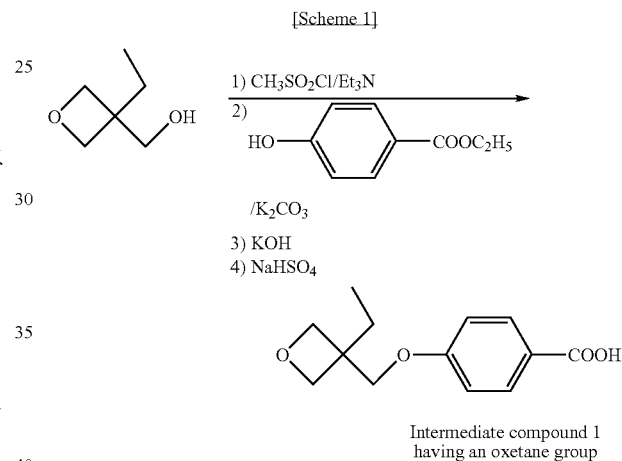

Reference Example 2

Synthesis of Intermediate Compound 2 Having an Oxetane Group

In accordance with Scheme 2 below, an intermediate compound 2 having an oxetane group was synthesized.

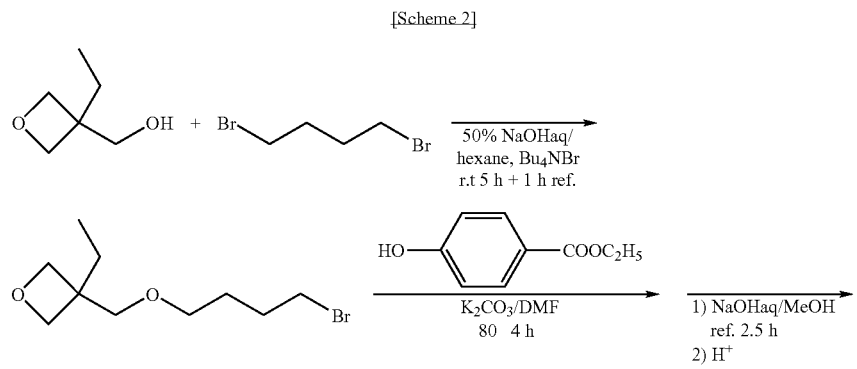

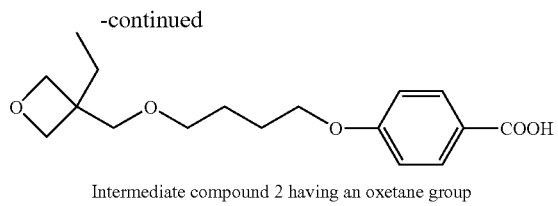

Intermediate compound 2 having an oxetane group

Reference Example 3

Synthesis of Acrylic Compound 3

In accordance with Scheme 3 below, an acrylic compound 3 was synthesized. The $^1$H-NMR spectrum of the resulting acrylic compound 3 is shown in FIG. 1.

[Scheme 3]

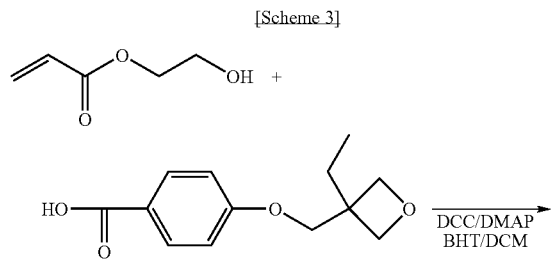

Acrylic compound 3

Reference Example 4

Synthesis of Acrylic Compound 4

Figure 2:
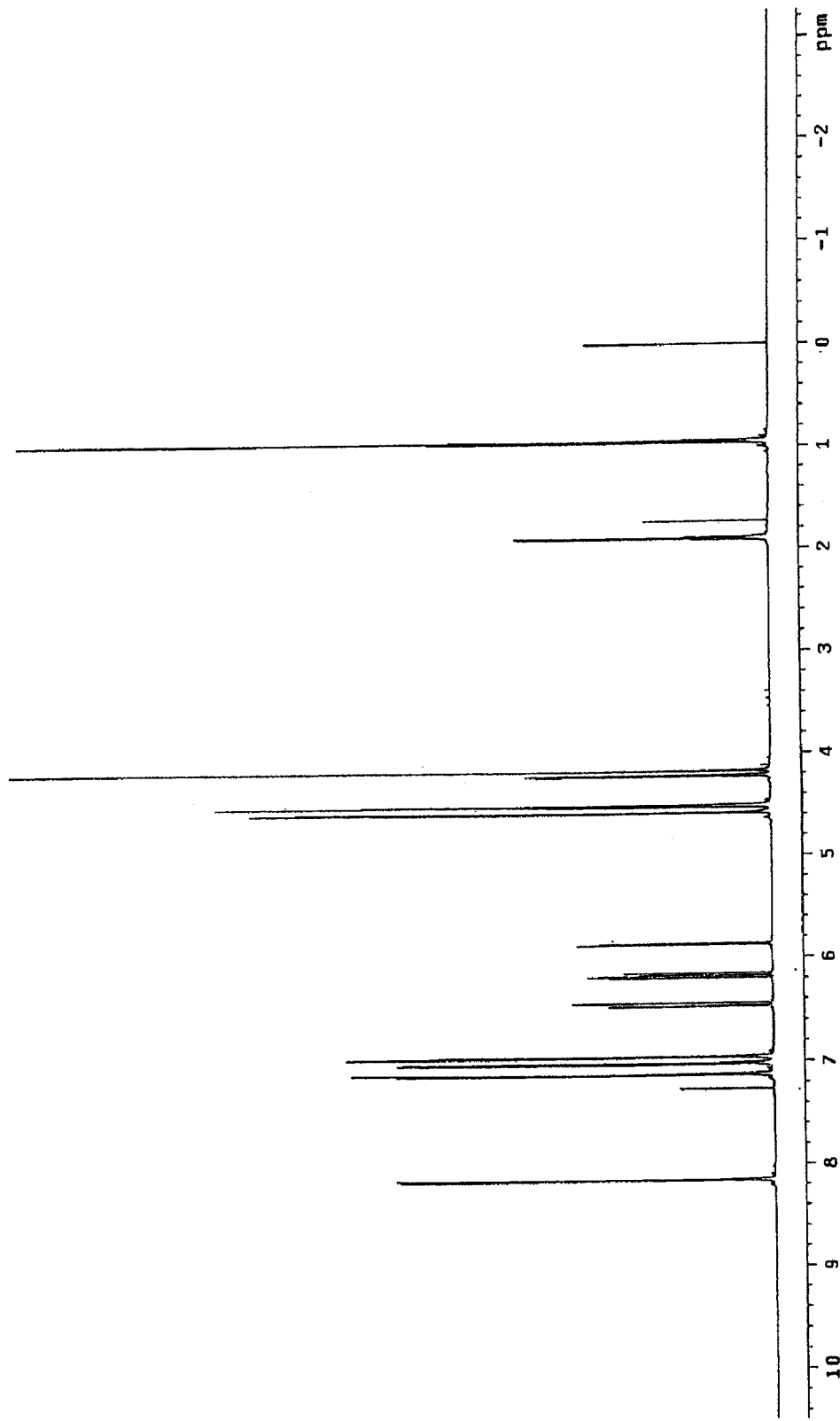
FIG. 2 is the $^1$NMR spectrum of acrylic compound 4.

In accordance with Scheme 4 below, an acrylic compound 4 was synthesized. The $^1$H-NMR spectrum of the resulting acrylic compound 4 is shown in FIG. 2.

[Scheme 4]

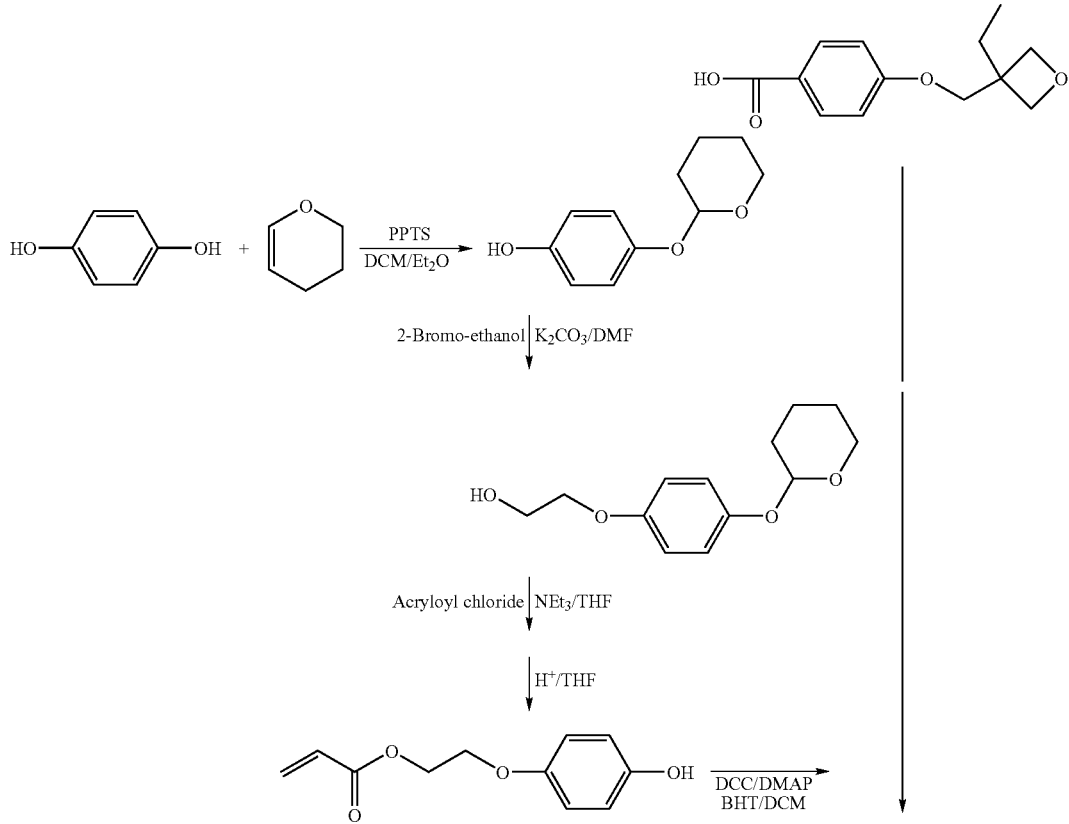

Figure 3:
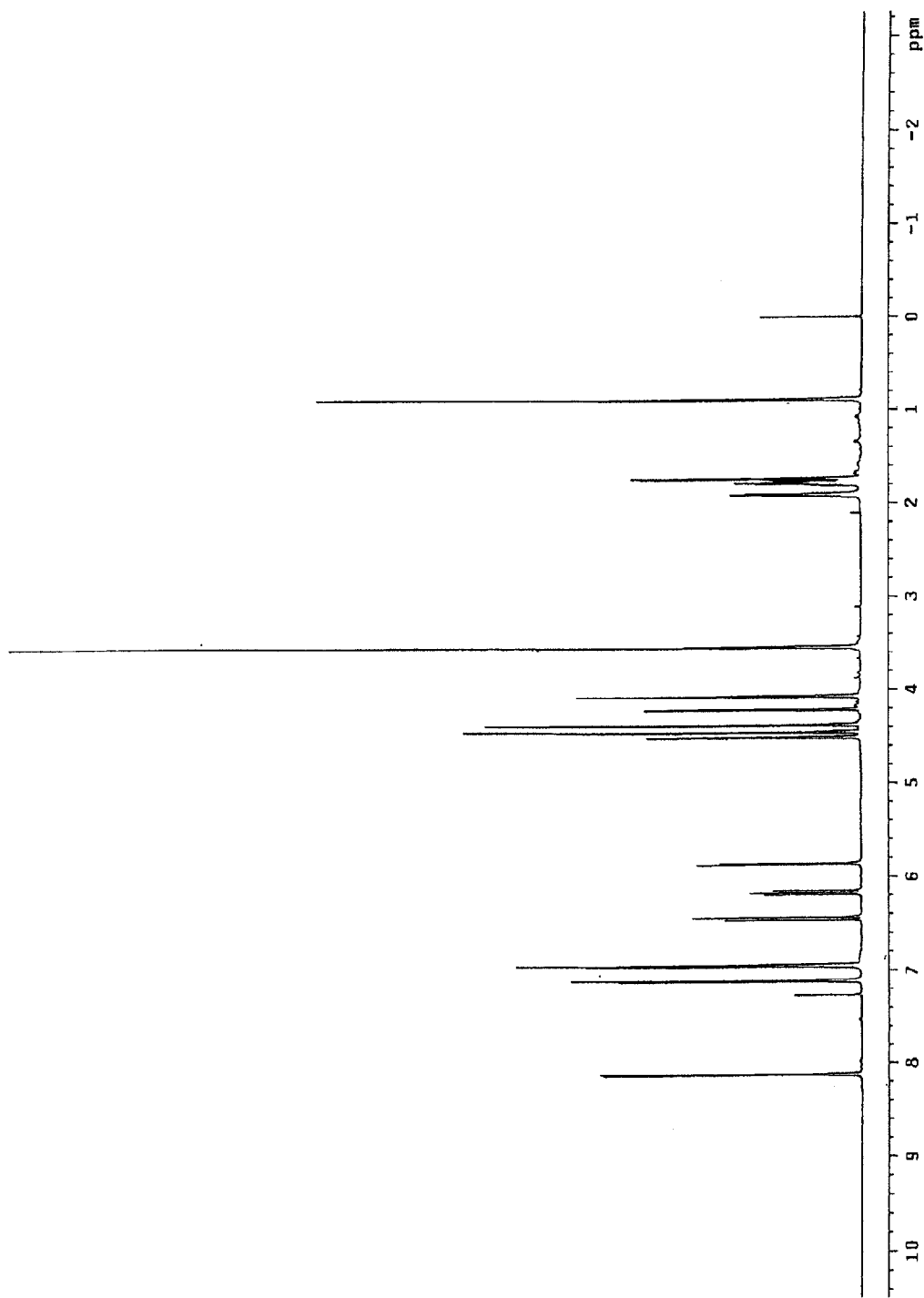
FIG. 3 is the $^1$NMR spectrum of acrylic compound 5.

-continued
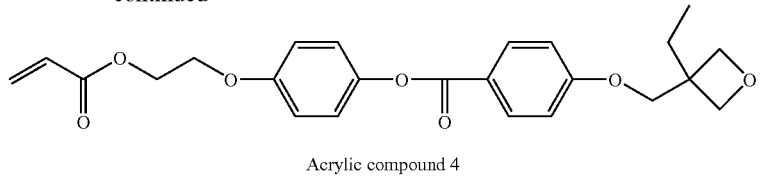
Acrylic compound 4
Reference Example 5
Synthesis of Acrylic Compound 5
In accordance with Scheme 5 below, an acrylic compound 5 was synthesized. The $^1$H-NMR spectrum of the resulting acrylic compound 5 is shown in FIG. 3.
[Scheme 5]
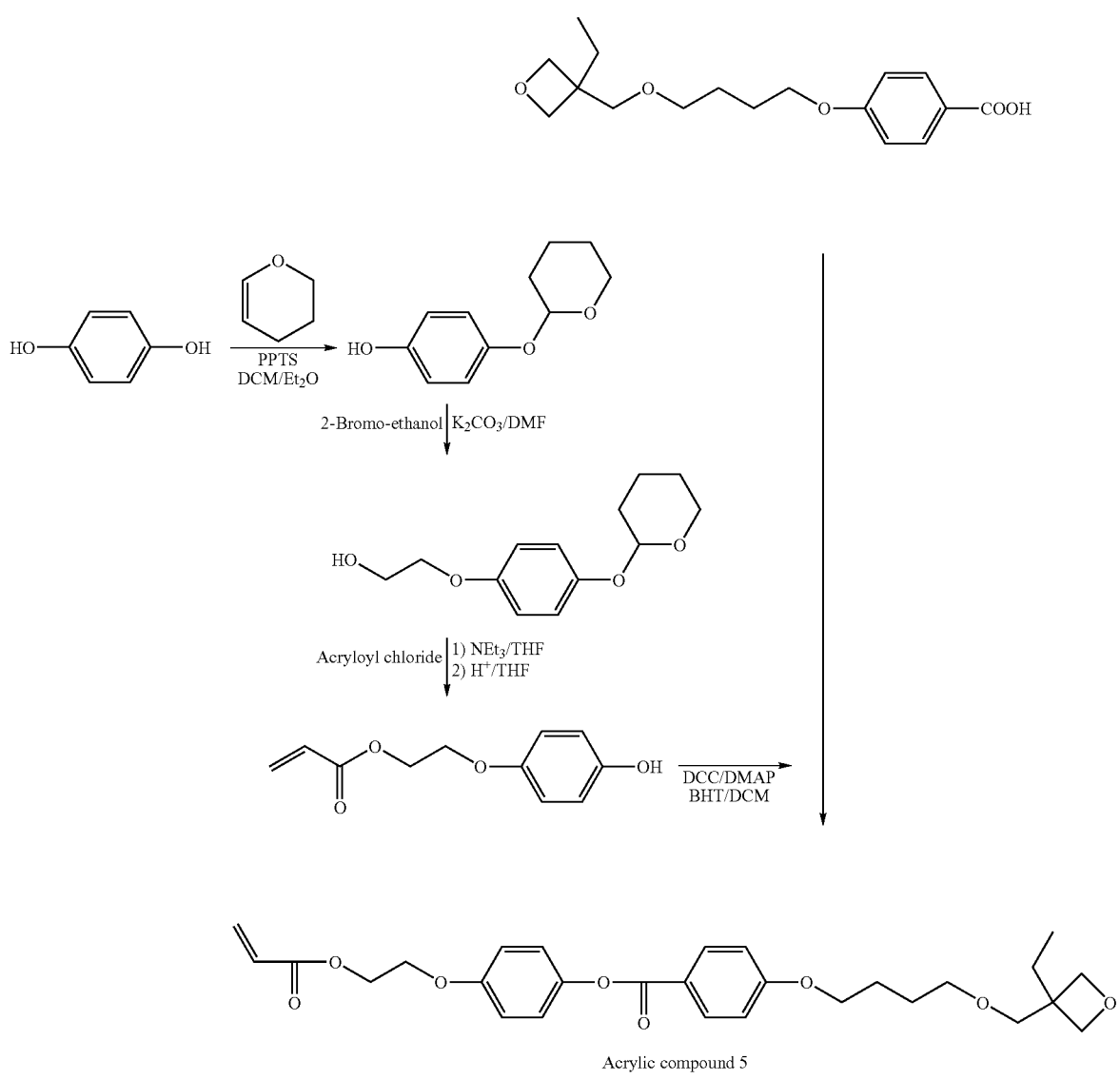
Acrylic compound 5

Reference Example 6
Synthesis of Acrylic Compound 6
In accordance with Scheme 6 below, an acrylic compound 6 was synthesized.
[Scheme 6]
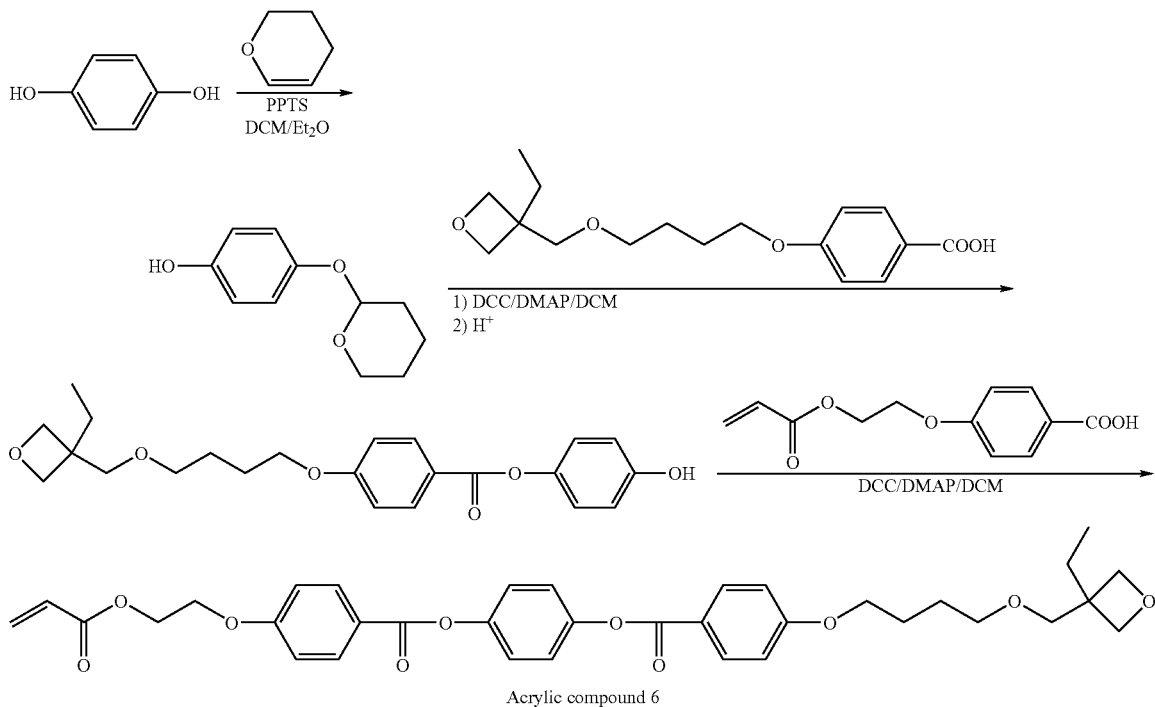
Acrylic compound 6
Reference Example 7
Synthesis of Acrylic Compound 7
In accordance with Scheme 7 below, an acrylic compound 7 was synthesized.
[Scheme 7]
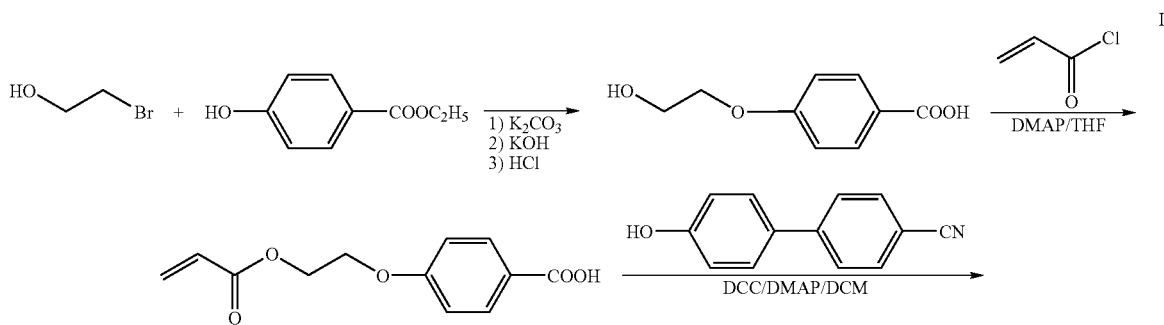

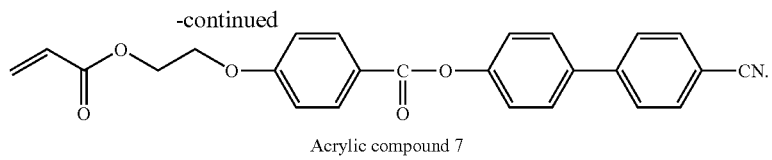
Acrylic compound 7
Reference Example 8
Synthesis of Acrylic Compound 8
In accordance with Scheme 8 below, an acrylic compound 8 was synthesized.
[Scheme 8]
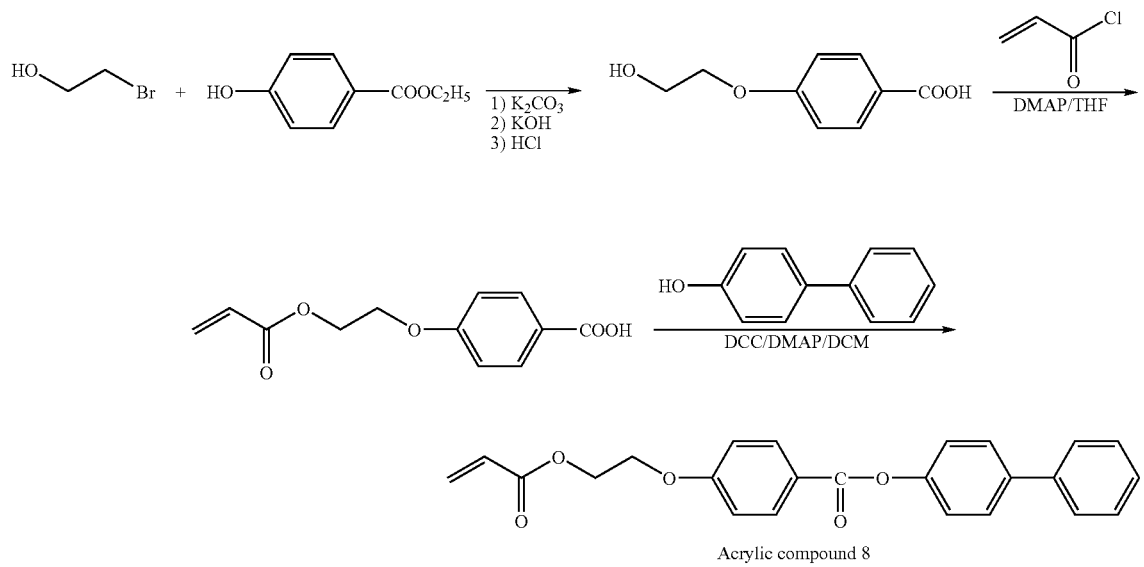
Acrylic compound 8
Reference Example 9
Synthesis of Acrylic Compound 9
In accordance with Scheme 9 below, an acrylic compound 9 was synthesized.
[Scheme 9]
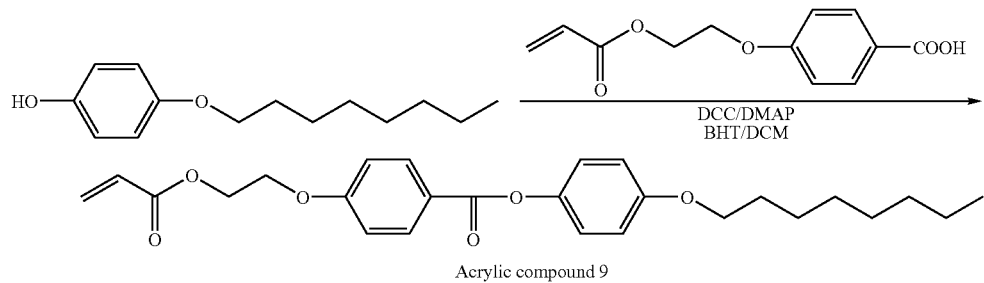
Acrylic compound 9

Reference Example 10

Synthesis of Acrylic Compound 10

In accordance with Scheme 10 below, an acrylic compound 10 was synthesized.

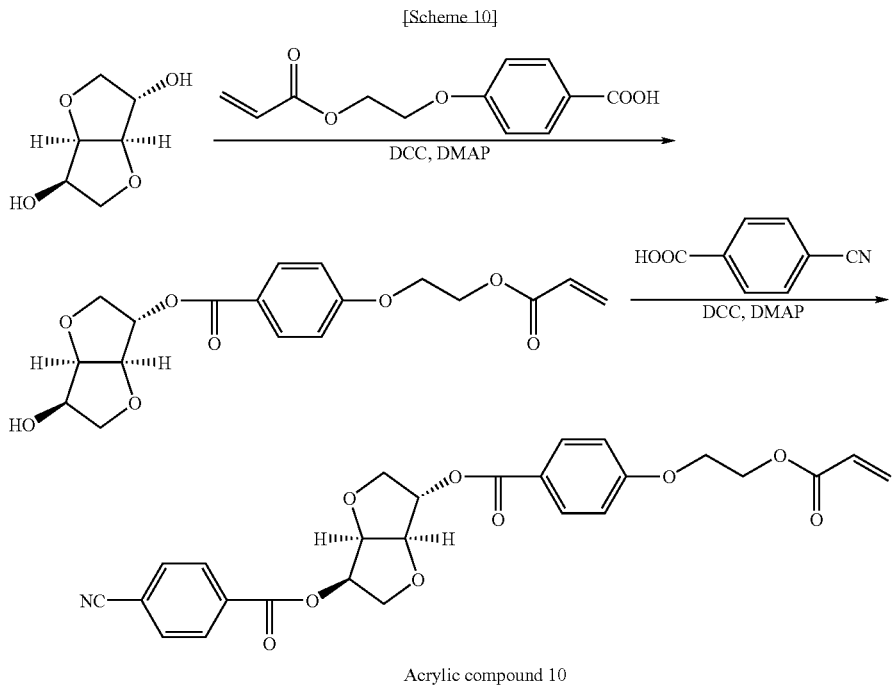

Reference Example 11

Synthesis of Liquid Crystalline Polyester 11

In a N-methylpyrrolidone solvent were added 97.188 g (722 mmol) of 3-chloromethyl-3-ethyloxetane, 9.70 g (30.1 mmol) of tetra-butylammonium bromide (reagent, manufactured by Tokyo Chemical Industry Co., Ltd.) and 100.00 g (602 mmol) of ethyl 4-hydroxybenzoate. They were mixed by stirring at a temperature of 120° C. for 3 hours to be reacted. The resulting reaction solution was diluted with water and then extracted with ethyl acetate to remove the solvent thereby producing a crude ethyl 4-(3-ethyloxetane-1-yl-methoxy)benzoate. An aqueous solution of 43.69 g (662 mmol) of potassium hydroxide with 85% purity was added to the ester and reacted at a temperature of 100° C. for 4 hours to be hydrolyzed, followed by dilution and precipitation with an aqueous solution of 91.40 g (662 mmol) of sodium hydrogensulfate monohydrate thereby producing a crude crystal of 4-(3-ethyloxetane-1-yl-methoxy)benzoic acid. The crude crystal was dissolved in acetnitrile to be recrsytallized thereby producing a crystal of 4-(3-ethyloxetane-1-yl-methoxy)benzoic acid.

A mixture of 12.00 g (50.8 mmol) of the resulting 4-(3-ethyloxetane-1-yl-methoxy)benzoic acid and 6.56 g (50.8 mmol) of N,N-diisobutylethylamine was dissolved in tetrahydrofuran having been purified by distillation. The resulting solution was added dropwise at a temperature of 0° C. to a tetrahydrofuran solution of distilled methanesulfonylchloride thereby producing a metanesulfonic acid anhydride of 4-(3-ethyloxetane-1-yl-methoxy)benzoic acid. In this anhydride were dissolved 9.37 g (46.2 mmol) of terephthalic acid chloride, 4.30 g (34.6 mmol) of methylhydroquinone, and 3.81 g (34.6 mmol) of catechol, followed by dropwise addition of a tetrahydrofuran solution of 15.18 g (150.0 mmol) of triethylamine, and 1.41 g (11.5 mmol) of N,N-dimethylaminopyridine. The mixed solution was reacted at a temperature of 0° C. for 2 hours and then heated to a temperature of 60° C. and reacted for 4 hours. Thereafter, the reaction solution was poured into an excess amount of methanol at room temperature, and then the reaction product was reprecipitated, washed, and dried thereby producing a liquid crystalline polyester 11. The inherent viscosity of the resulting polyester 11 was 0.090 dL/g. It was confirmed through a polarizing microscope observation on a hot stage that the C-Nm and Nm-Iso phase transition temperatures were 68° C. and 268° C., respectively.

Reference Example 12

Synthesis of Side Chain Liquid Crystalline Polyacrylate 12

A side chain liquid crystalline polyacrylate 12 was synthesized by radical-polymerizing 2 parts (molar ratio) of the acrylic compound 4 and 8 parts (molar ratio) of the acrylic compound 7 at a temperature of 90° C. under a nitrogen atmosphere for 6 hours using 2,2'-azobisisobutyronitrile as an initiator and DMF as a solvent and reprecipitating the polymerized product with methanol.

GPC measurement revealed that the weight-average molecular weight of the side chain liquid crystalline polyacrylate 12 was 9,100.

DSC measurement revealed that the glass transition temperature (Tg) was 82° C. It was confirmed from a polarizing microscope observation on the hot stage that the polyacrylate exhibited a nematic liquid crystal phase at the glass transition temperature or higher and the Nm-Iso transition temperature was 248° C.

Reference Example 13

Synthesis of Side Chain Liquid Crystalline Polyacrylate 13

A side chain liquid crystalline polyacrylate 13 was synthesized by radical-polymerizing 2 parts (molar ratio) of the acrylic compound 5, 6 parts (molar ratio) of the acrylic compound 7 and 2 parts (molar ratio) of the acrylic compound 8 at a temperature of 90° C. under a nitrogen atmosphere for 6 hours using 2,2'-azobisisobutyronitrile as an initiator and DMF as a solvent and reprecipitating the polymerized product with methanol.

GPC measurement revealed that the weight-average molecular weight of the side chain liquid crystalline polyacrylate 13 was 9,700.

DSC measurement revealed that the glass transition temperature (Tg) was 78° C. It was confirmed from a polarizing microscope observation on the hot stage that the polyacrylate exhibited a nematic liquid crystal phase at the glass transition temperature or higher and the Nm-Iso transition temperature was 229° C.

Reference Example 14

Synthesis of Side Chain Liquid Crystalline Polyacrylate 14

A side chain liquid crystalline polyacrylate 14 was synthesized by radical-polymerizing 1.3 part (molar ratio) of the acrylic compound 4, 8 parts (molar ratio) of the acrylic compound 7 and 0.7 part (molar ratio) of the acrylic compound 10 at a temperature of 90° C. under a nitrogen atmosphere for 6 hours using 2,2'-azobisisobutyronitrile as an initiator and DMF as a solvent and reprecipitating the polymerized product with methanol.

GPC measurement revealed that the weight-average molecular weight of the side chain liquid crystalline polyacrylate 14 was 9,600.

DSC measurement revealed that the glass transition temperature (Tg) was 90° C. It was confirmed from a polarizing microscope observation on the hot stage that the polyacrylate exhibited a cholesteric liquid crystal phase at the glass transition temperature or higher and the Ch-Iso transition temperature was 228° C.

Reference Example 15

Synthesis of Side Chain Liquid Crystalline Polyacrylate 15

A side chain liquid crystalline polyacrylate 15 was synthesized by radical-polymerizing 1 part (molar ratio) of the acrylic compound 3, 1 part (molar ratio) of the acrylic compound 6, 7 parts (molar ratio) of the acrylic compound 7, 0.5 part (molar ratio) of the acrylic compound 9, and 0.5 part (molar ratio) of stearyl acrylate at a temperature of 90° C. under a nitrogen atmosphere for 6 hours using 2,2'-azobisisobutyronitrile as an initiator and DMF as a solvent and reprecipitating the polymerized product with methanol. GPC measurement revealed that the weight-average molecular weight of the side chain liquid crystalline polyacrylate 15 was 9,700.

DSC measurement revealed that the glass transition temperature (Tg) was 79° C. It was confirmed from a polarizing microscope observation on the hot stage that the polyacrylate exhibited a liquid crystal phase at the glass transition temperature or higher and the Nm-Iso transition temperature was 190° C.

Reference Example 16

Synthesis of Dioxetane Compound 16

Figure 4:
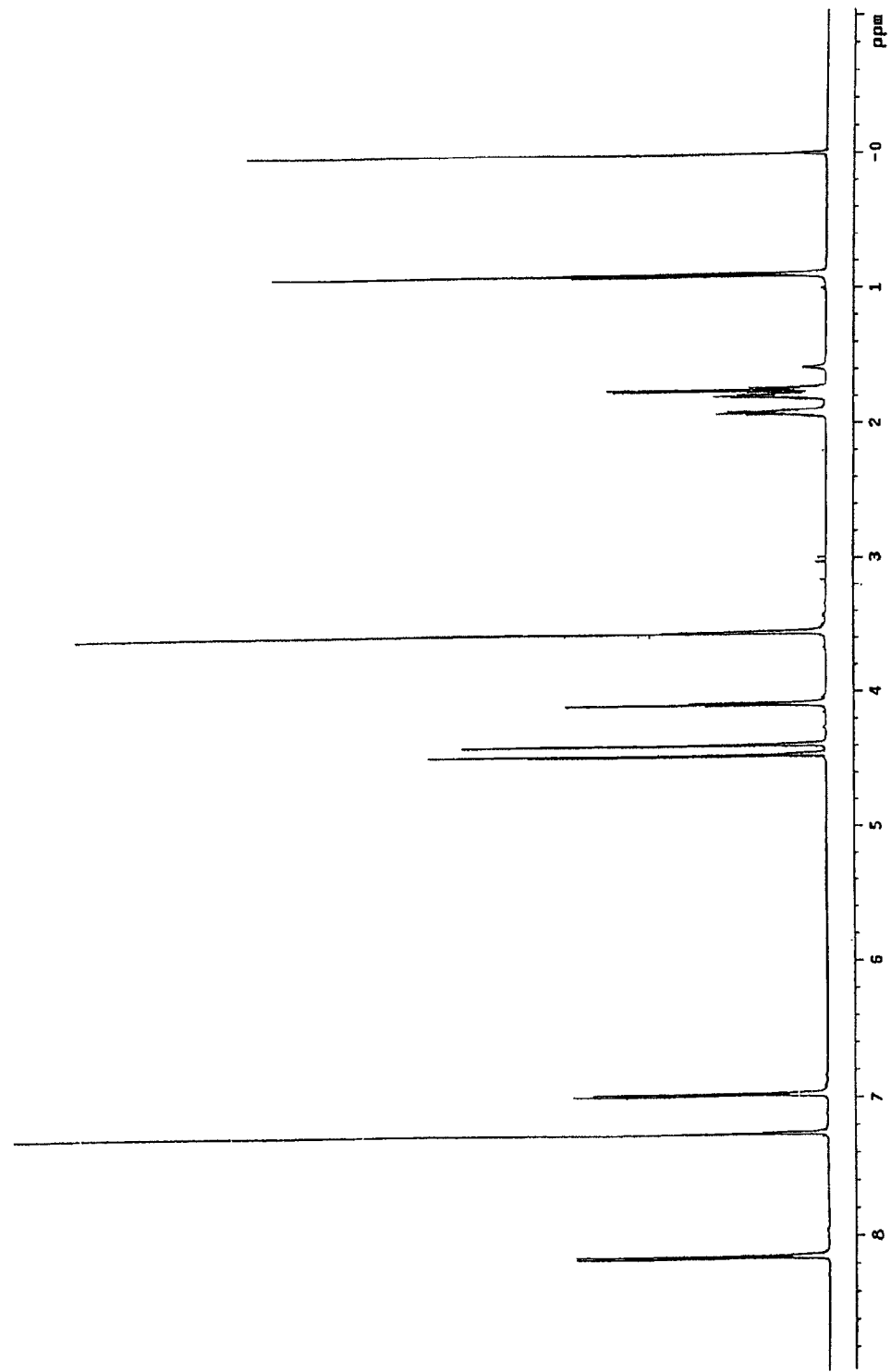
FIG. 4 is the $^1$NMR spectrum of dioxetane compound 16.

In accordance with Scheme 11 below, a dioxetane compound 16 was synthesized. The $^1$H-NMR spectrum of the resulting dioxetane compound 16 is shown in FIG. 4.

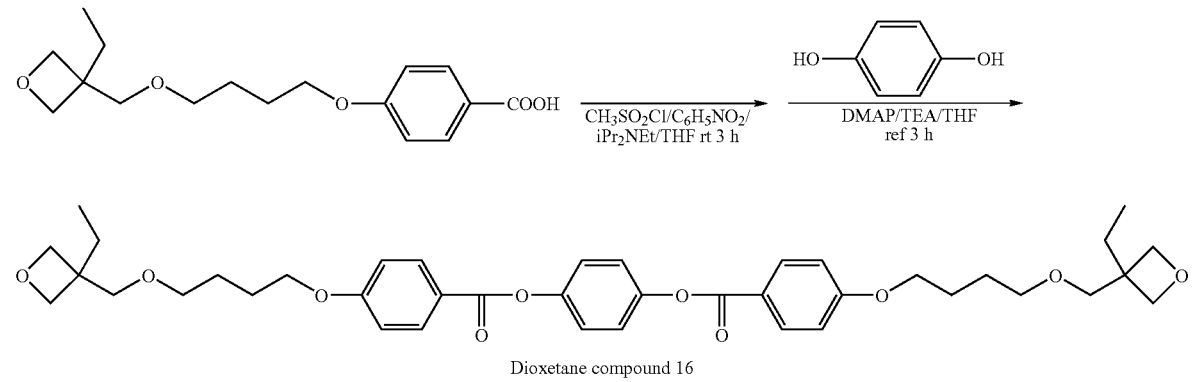

Dioxetane compound 16

Reference Example 17

Synthesis of Dioxetane Compound 17

Figure 5:
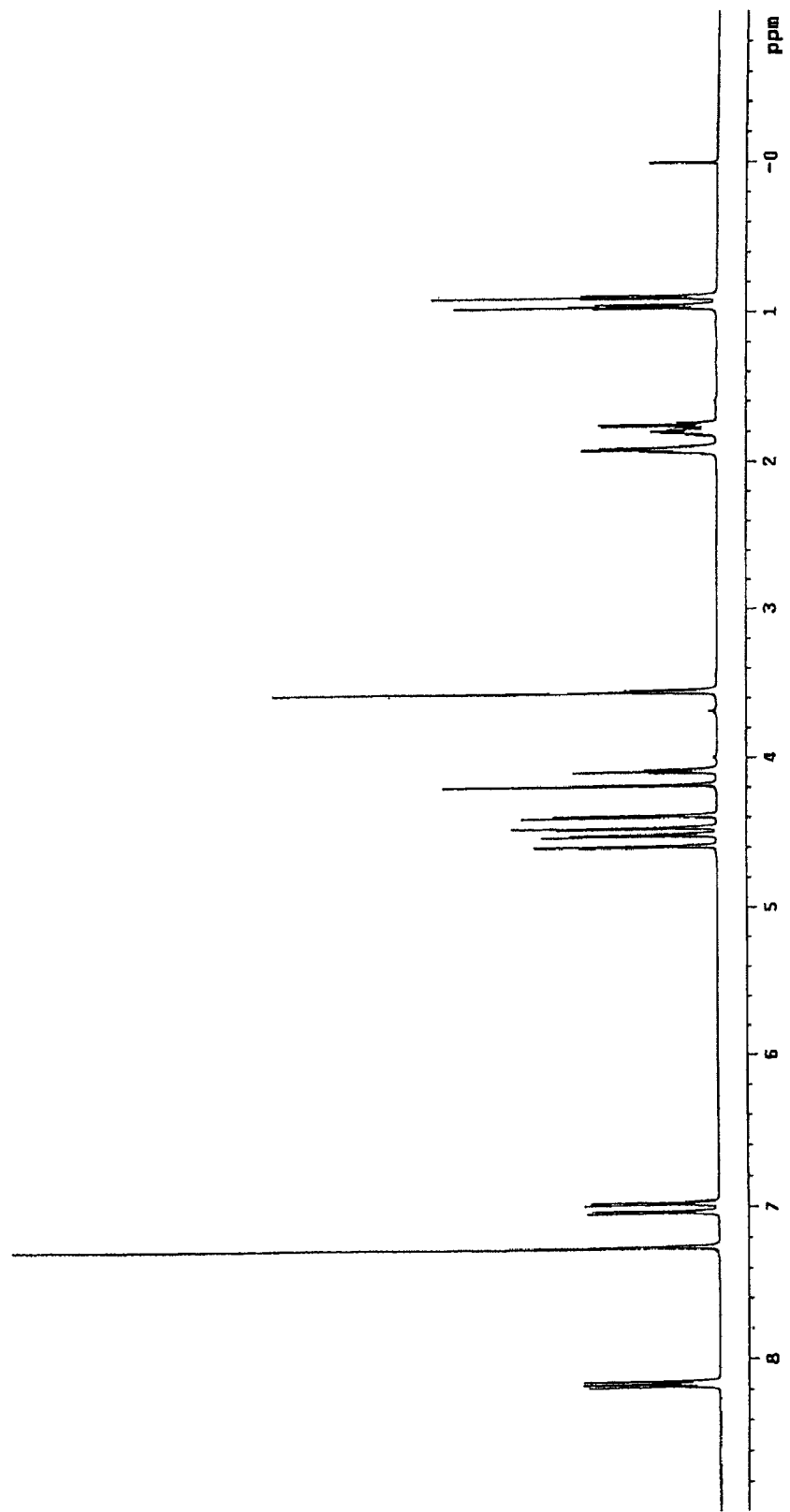
FIG. 5 is the $^1$NMR spectrum of dioxetane compound 17.

In accordance with Scheme 12 below, a dioxetane compound 17 was synthesized. The $^1$H-NMR spectrum of the resulting dioxetane compound 17 is shown in FIG. 5.

[Scheme 12]

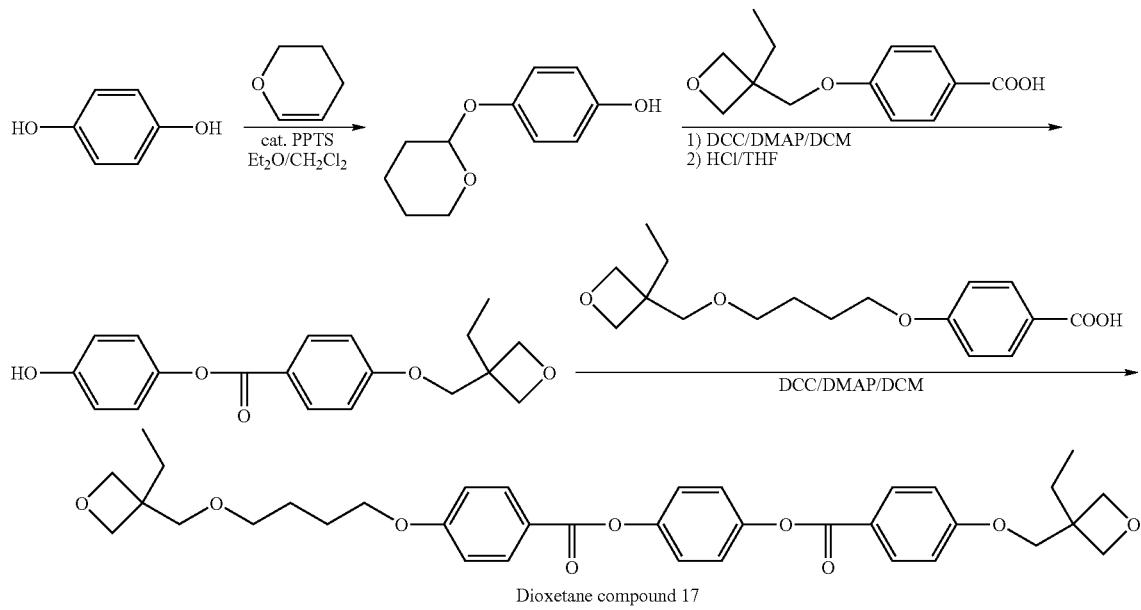

Dioxetane compound 17

Example 1

In 9 ml of cyclohexanone were dissolved 0.10 g of the acrylic compound 4 synthesized in Reference Example 4 and 0.90 g of the main chain liquid crystalline polymer 11 synthesized in Reference Example 11, followed by addition of 0.10 g of a propylene carbonate solution of 50 percent of triarylsulfonium hexafluoroantimonate (a reagent manufactured by Aldrich Co.) at a dark place and filtration of insolubles with a polytetrafluoroethylene filter with a pore size of 0.45 μm thereby preparing a solution of a liquid crystalline composition.

The resulting solution was spin-coated over a 50 μm thickness PEN film "Teonex Q-51" (manufactured by Teijin Dupont Films Japan Ltd.) whose surface had been subjected to a rubbing treatment with a rayon cloth and then a hot air of about 60° C. was slowly blown to the film to remove the solvent. Thereafter, the film was heated at a temperature of 150° C. in an oven for 3 minutes so as to form a uniform liquid crystal alignment. Thereafter, the film was irradiated with an ultraviolet light of an integrated irradiation dose of 300 mJ/cm² from a high-pressure mercury lamp and then cooled thereby producing a cured liquid crystalline composition layer.

Since the PEN film used as a substrate had birefringence and thus is not preferable as an optical film, the resulting film layer was transferred via an ultraviolet curing type adhesive "UV-3400" (manufactured by Toagosei Co., Ltd.) onto a TAC film thereby producing a liquid crystal film. That is, the UV-3400 with a thickness of 5 μm was coated over the cured liquid crystalline composition layer on the PEN film and laminated with a TAC film. After the laminate was subjected to an irradiation of ultraviolet light of 400 mJ/cm² from the TAC film side so as to cure the adhesive, the PEN film was released. The resulting liquid crystal film had no defect in peeled portion and was a liquid crystal film aligned in a monodomain nematic alignment. The liquid crystalline composition layer had a thickness of 0.85 μm and a front Δnd of 112 nm.

Further, ultraviolet curing type adhesive "UV-3400" with a thickness of 5 μm was coated over the liquid crystalline composition layer and laminated with a TAC film. The laminate was subjected to an irradiation of ultraviolet light of 400 mJ/cm² from the TAC film side so as to cure the adhesive thereby producing a film with a layer structure of TAC/UV-3400/liquid crystalline composition layer/UV-3400/TAC.

The resulting film was subjected to a 180 degree peeling test using Strograph E-L manufactured by Toyo Seiki Seisaku-sho, Ltd. The test was carried out at a temperature of 23° C. and a peel speed of 300 mm/min.

The peel strength of the liquid crystalline composition layer/UV-3400 was 25 gf/inch.

The film was attached via a non-carrier tacky adhesive onto a 2 mm thickness sode-lime glass plate. Over the film was attached a polarizer (SQW-862 manufactured by Sumitomo Chemical Co., Ltd.) such that the aligned direction (rubbing direction) of the composition was aligned with the absorption axis of the polarizer. This sample was observed through the polarizer on a backlight and found to be a uniform film. After the sample was kept in a thermostat whose temperature was set at 90° C., for 24 hours, it was taken out therefrom and similarly observed. As a result, any particular change or disorder in the alignment was not observed.

Example 2

In 9 ml of cyclohexanone were dissolved 0.05 g of the acrylic compound 4 synthesized in Reference Example 4, 0.75 g of the side chain liquid crystalline polyacrylate 12 synthesized in Reference Example 12, and 0.2 g of the dioxetane compound 16 synthesized in Reference Example 16, followed by addition of 0.10 g of a propylene carbonate solution of 50 percent of triarylsulfonium hexafluoroantimonate (a reagent manufactured by Aldrich Co.) at a dark place and filtration of insolubles with a polytetrafluoroethylene filter with a pore size of 0.45 µm thereby preparing a solution of a liquid crystalline composition.

The resulting solution was spin-coated over a 50 µm thickness PEN film "Teonex Q-51" (manufactured by Teijin Dupont Films Japan Ltd.) whose surface had been subjected to a rubbing treatment with a rayon cloth and then a hot air of about 60° C. was slowly blown to the film to remove the solvent. Thereafter, the film was heated at a temperature of 150° C. in an oven for 3 minutes so as to form a uniform liquid crystal alignment. Thereafter, the film was irradiated with an ultraviolet light of an integrated irradiation dose of 300 mJ/cm$^2$ from a high-pressure mercury lamp and then cooled thereby producing a cured liquid crystalline composition layer.

Since the PEN film used as a substrate had birefringence and thus is not preferable as an optical film, the resulting film layer was transferred via an ultraviolet curing type adhesive "UV-3400" (manufactured by Toagosei Co., Ltd.) onto a TAC film thereby producing a liquid crystal film. That is, the UV-3400 with a thickness of 5 µm was coated over the cured liquid crystalline composition layer on the PEN film and laminated with a TAC film. After the laminate was subjected to an irradiation of ultraviolet light of 400 mJ/cm$^2$ from the TAC film side so as to cure the adhesive, the PEN film was released. The resulting liquid crystal film had no defect in peeled portion and as a result of observation of the resulting film through a polarizing microscope, it was confirmed that the film exhibited a uniform monodomain liquid crystal alignment having no disclination. The Δnd viewed from the front was 120 nm. The Δnd viewed from a position tilted at an angle of 40 degrees from the vertical direction along the rubbing axis was 153 nm while the Δnd viewed from an opposite position tilted at an angle of −40 degrees was 61 nm. The both Δnds were asymmetrical. From these observations, it was recognized that the film had a nematic hybrid aligned structure because there was no point wherein the Δnd is zero nm at any angle. The average tilt angle was 28 degrees. The thickness of the liquid crystalline composition layer was 0.84 µm.

Further, ultraviolet curing type adhesive "UV-3400" with a thickness of 5 µm was coated over the liquid crystalline composition layer and laminated with a TAC film. The laminate was subjected to an irradiation of ultraviolet light of 400 mJ/cm$^2$ from the TAC film side so as to cure the adhesive thereby producing a film with a layer structure of TAC/UV-3400/liquid crystalline composition layer/UV-3400/TAC.

The resulting film was subjected to a 180 degree peeling test using Strograph E-L manufactured by Toyo Seiki Seisaku-sho, Ltd. The test was carried out at a temperature of 23° C. and a peel speed of 300 mm/min.

The peel strength of the liquid crystalline composition layer/UV-3400 was 30 gf/inch.

The film was attached via a non-carrier tacky adhesive onto a 2 mm thickness sode-lime glass plate. Over the film was attached a polarizer (SQW-862 manufactured by Sumitomo Chemical Co., Ltd.) such that the aligned direction (rubbing direction) of the composition was aligned with the absorption axis of the polarizer. This sample was observed through the polarizer on a backlight and found to be a uniform film. After the sample was kept in a thermostat whose temperature was set at 90° C., for 24 hours, it was taken out therefrom and similarly observed. As a result, any particular change or disorder in the alignment was not observed.

Example 3

In 9 ml of cyclohexanone were dissolved 0.08 g of the acrylic compound 5 synthesized in Reference Example 5, 0.80 g of the side chain liquid crystalline polyacrylate 13 synthesized in Reference Example 13, and 0.12 g of the dioxetane compound 17 synthesized in Reference Example 17, followed by addition of 0.10 g of a propylene carbonate solution of 50 percent of triarylsulfonium hexafluoroantimonate (a reagent manufactured by Aldrich Co.) at a dark place and filtration of insolubles with a polytetrafluoroethylene filter with a pore size of 0.45 µm thereby preparing a solution of a liquid crystalline composition.

The same procedures of Example 1 were repeated except for using this solution. The PEN film was released. The resulting liquid crystal film had no defect in peeled portion and was a uniform monodomain liquid crystal film.

As a result of observation of the resulting film through a polarizing microscope, it was confirmed that the film exhibited a uniform monodomain liquid crystal alignment having no disclination. The Δnd viewed from the front was 97 nm. The Δnd viewed from a position tilted at an angle of 40 degrees from the vertical direction along the rubbing axis was 140 nm while the Δnd viewed from the opposite position tilted at an angle of −40 degrees was 41 nm. The both Δnds were asymmetrical. From these observations, it was recognized that the film had a nematic hybrid aligned structure because there was no point wherein the Δnd is zero nm at any angle. The average tilt angle was 39 degrees. The thickness of the liquid crystalline composition layer was 1.08 µm.

Further, ultraviolet curing type adhesive "UV-3400" with a thickness of 5 µm was coated over the liquid crystalline composition layer and laminated with a TAC film. The laminate was subjected to an irradiation of ultraviolet light of 400 mJ/cm$^2$ from the TAC film side so as to cure the adhesive thereby producing a film with a layer structure of TAC/UV-3400/liquid crystalline composition layer/UV-3400/TAC. The resulting film was subjected to a 180 degree peeling test using Strograph E-L manufactured by Toyo Seiki Seisaku-sho, Ltd. The peel strength of the liquid crystalline composition layer/UV-3400 was 38 gf/inch.

The film was attached via a non-carrier tacky adhesive onto a 2 mm thickness sode-lime glass plate. Over the film was attached a polarizer (SQW-862 manufactured by Sumitomo Chemical Co., Ltd.) such that the aligned direction (rubbing direction) of the composition was aligned with the absorption axis of the polarizer. This sample was observed through the polarizer on a backlight and found to be a uniform film. After the sample was kept in a thermostat whose temperature was set at 90° C., for 24 hours, it was taken out therefrom and similarly observed. As a result, any particular change or disorder in the alignment was not observed.

Example 4

In 9 ml of cyclohexanone were dissolved 0.08 g of the acrylic compound 6 synthesized in Reference Example 6, 0.80 g of the side chain liquid crystalline polyacrylate 14 synthesized in Reference Example 14, and 0.12 g of the dioxetane compound 16 synthesized in Reference Example 16, followed by addition of 0.10 g of "UVI-6992" (a 50 percent propylene carbonate solution) manufactured by DOW Chemical Company at a dark place and filtration of insolubles with a polytetrafluoroethylene filter with a pore size of 0.45 μm thereby preparing a solution of a liquid crystalline composition.

The same procedures of Example 1 were repeated except for using this solution. The PEN film was released. The resulting liquid crystal film had no defect in peeled portion and was a uniform monodomain liquid crystal film.

As a result of observation of the resulting optical film through a polarizing microscope, it was confirmed that the film exhibited a uniform monodomain cholesteric liquid crystal alignment having no disclination. The film had a selective reflection light peculiar to the cholesteric alignment when viewed from the front. When the transmission spectrum of the liquid crystal film was evaluated through a spectroscope, a region wherein the transmitted light peculiar to the selective reflection was decreased was observed around 580 nm in the visible light region. The thickness of the liquid crystalline composition layer was 0.89 μm.

Further, ultraviolet curing type adhesive "UV-3400" with a thickness of 5 μm was coated over the liquid crystalline composition layer and laminated with a TAC film. The laminate was subjected to an irradiation of ultraviolet light of 400 mJ/cm$^2$ from the TAC film side so as to cure the adhesive thereby producing a film with a layer structure of TAC/UV-3400/liquid crystalline composition layer/UV-3400/TAC. The resulting film was subjected to a 180 degree peeling test using Strograph E-L manufactured by Toyo Seiki Seisaku-sho, Ltd. The peel strength of the liquid crystalline composition layer/UV-3400 was 30 gf/inch.

The film was attached via a non-carrier tacky adhesive onto a 2 mm thickness sode-lime glass plate. Over the film was attached a polarizer (SQW-862 manufactured by Sumitomo Chemical Co., Ltd.) such that the aligned direction (rubbing direction) of the composition was aligned with the absorption axis of the polarizer. This sample was observed through the polarizer on a backlight and found to be a uniform film. After the sample was kept in a thermostat whose temperature was set at 90° C., for 24 hours, it was taken out therefrom and similarly observed. As a result, any particular change or disorder in the alignment was not observed.

Example 5

In 9 ml of cyclohexanone were dissolved 0.15 g of the acrylic compound 3 synthesized in Reference Example 3, 0.77 g of the side chain liquid crystalline polyacrylate 15 synthesized in Reference Example 15, and 0.08 g of the dioxetane compound 17 synthesized in Reference Example 17, followed by addition of 0.10 g of a propylene carbonate solution of 50 percent of triarylsulfonium hexafluoroantimonate (a reagent manufactured by Aldrich Co.) at a dark place and filtration of insolubles with a polytetrafluoroethylene filter with a pore size of 0.45 μm thereby preparing a solution of a liquid crystalline composition.

The same procedures of Example 1 were repeated except for using this solution. The PEN film was released. The resulting liquid crystal film had no defect in peeled portion and was a uniform monodomain liquid crystal film.

As a result of observation of the resulting film through a polarizing microscope, it was confirmed that the film exhibited a uniform monodomain liquid crystal alignment having no disclination. The Δnd viewed from the front was 92 nm. The Δnd viewed from a position tilted at an angle of 40 degrees from the vertical direction along the rubbing axis was 120 nm while the Δnd viewed from the opposite position tilted at an angle of −40 degrees was 43 nm. The both Δnds were asymmetrical. From these observations, it was recognized that the film had a nematic hybrid alignment structure because there was no point wherein the Δnd is zero nm at any angle. The average tilt angle was 31 degrees. The thickness of the liquid crystalline composition layer was 0.82 μm.

Further, ultraviolet curing type adhesive "UV-3400" with a thickness of 5 μm was coated over the liquid crystalline composition layer and laminated with a TAC film. The laminate was subjected to an irradiation of ultraviolet light of 400 mJ/cm$^2$ from the TAC film side so as to cure the adhesive thereby producing a film with a layer structure of TAC/UV-3400/liquid crystalline composition layer/UV-3400/TAC. The resulting film was subjected to a 180 degree peeling test using Strograph E-L manufactured by Toyo Seiki Seisaku-sho, Ltd. The peel strength of the liquid crystalline composition layer/UV-3400 was 42 gf/inch.

The film was attached via a non-carrier tacky adhesive onto a 2 mm thickness sode-lime glass plate. Over the film was attached a polarizer (SQW-862 manufactured by Sumitomo Chemical Co., Ltd.) such that the aligned direction (rubbing direction) of the composition was aligned with the absorption axis of the polarizer. This sample was observed through the polarizer on a backlight and found to be a uniform film. After the sample was kept in a thermostat whose temperature was set at 90° C., for 24 hours, it was taken out therefrom and similarly observed. As a result, any particular change or disorder in the alignment was not observed.

Example 6

In 9 ml of cyclohexanone were dissolved 0.05 g of the acrylic compound 5 synthesized in Reference Example 5, 0.90 g of the main chain liquid crystalline polymer 11 synthesized in Reference Example 11, and 0.05 g of the dioxetane compound 16 synthesized in Reference Example 16, followed by addition of 0.10 g of a propylene carbonate solution of 50 percent of triarylsulfonium hexafluoroantimonate (a reagent manufactured by Aldrich Co.) at a dark place and filtration of insolubles with a polytetrafluoroethylene filter with a pore size of 0.45 μm thereby preparing a solution of a liquid crystalline composition.

A liquid crystal film having a liquid crystalline composition layer aligned and cured on a TAC film was produced by the same procedures of Example 1 except for using this solution. The film had no defect in peeled portion and was a uniform film.

The peel strength was measured by the same procedures of Example 1 and was 28 gf/inch. The heat resistance of the film was examined by the same procedures of Example 1. Any particular change or disorder in the alignment was not observed.

Example 7

In 9 ml of cyclohexanone were dissolved 0.1 g of the acrylic compound 5 synthesized in Reference Example 5 and 0.90 g of the side chain liquid crystalline polymer 13 synthesized in Reference Example 13, followed by addition of 0.10 g of a propylene carbonate solution of 50 percent of triarylsulfonium hexafluoroantimonate (a reagent manufactured by Aldrich Co.) at a dark place and filtration of insolubles with a polytetrafluoroethylene filter with a pore size of 0.45 μm thereby preparing a solution of a liquid crystalline composition.

A liquid crystal film having a liquid crystalline composition layer aligned and cured on a TAC film was produced by the same procedures of Example 1 except for using this solution. The film had no defect in peeled portion and was a uniform film.

The peel strength was measured by the same procedures of Example 1 and was 34 gf/inch. The heat resistance of the film was examined by the same procedures of Example 1. Any particular change or disorder in the alignment was not observed.

Comparative Example 1

A solution of a cationically polymerizable composition was prepared by the same procedures of Example 1 except that the acrylic compound 4 was not used upon preparation of the solution of the liquid crystalline composition in Example 1.

A liquid crystal film having a composition layer aligned and cured on a TAC film was produced using this solution by the same procedures of Example 1. The film had significant defects in peeled portion but was uniformly aligned except for the defective peeled portion.

The peel strength was measured by the same procedures of Example 1. The peel strength of the composition layer/UV-3400 was 8 gf/inch which was extremely weak. The heat resistance of the film was examined by the same procedures of Example 1. Any particular change or disorder in the alignment was not observed.

Comparative Example 2

A solution of a cationically polymerizable composition was prepared by the same procedures of Example 2 except that the acrylic compound 4 was not used upon preparation of the solution of the liquid crystalline composition in Example 2.

A liquid crystal film having a composition layer aligned and cured on a TAC film was produced using this solution by the same procedures of Example 1. The film had some defects in peeled portion but was uniformly aligned except for the deficient peeled portion.

The peel strength was measured by the same procedures of Example 1. The peel strength of the composition layer/UV-3400 was 5 gf/inch which was extremely weak. The heat resistance of the film was examined by the same procedures of Example 1. Any particular change or disorder in the alignment was not observed.

Comparative Example 3

A solution of a cationically polymerizable composition was prepared by the same procedures of Example 2 except that 0.003 g of the acrylic compound 4, 0.77 g of the side chain polyacrylate 12, and 0.227 g of the dioxetane compound 16 were used upon preparation of the solution of the liquid crystalline composition in Example 2.

A liquid crystal film having a composition layer aligned and cured on a TAC film was produced using this solution with the same procedures of Example 1. The film had some defects in peeled portion but was uniformly aligned except for the defective peeled portion.

The peel strength was measured by the same procedures of Example 1. The peel strength of the composition layer/UV-3400 was 5 gf/inch which was extremely weak. The heat resistance of the film was examined by the same procedures of Example 1. Any particular change or disorder in the alignment was not observed.

Comparative Example 4

A solution of a cationically polymerizable composition was prepared by the same procedures of Example 3 except that 0.23 g of the acrylic compound 5, 0.67 g of the side chain polyacrylate 13, and 0.1 g of the dioxetane compound 17 were used upon preparation of the solution of the liquid crystalline composition in Example 3.

A liquid crystal film having a composition layer aligned and cured on a TAC film was produced using this solution by the same procedures of Example 1. The film was uniformly aligned.

The peel strength was measured by the same procedures of Example 1. The peel strength of the composition layer/UV-3400 was 34 gf/inch which was strong. The heat resistance of the film was examined by the same procedures of Example 1. White spots assumedly caused by leakage of light due to disordered liquid crystal alignment in peripheries were observed.

Comparative Example 5

A solution of a cationically polymerizable composition was prepared by the same procedures of Example 2 except that 0.05 g of stearyl acrylate (manufactured by Tokyo Chemical Industry Co., Ltd.) was used in place of the acrylic compound 4 upon preparation of the solution of the liquid crystalline composition in Example 2.

An aligned film was produced instead of a liquid crystal film by the same procedures of Example 1. No defect in peeling was observed.

The peel strength was measured by the same procedures of Example 1 was 20 gf/inch. The heat resistance of the film was examined by the same procedures of Example 1. White spots assumedly caused by leakage of light due to disordered liquid crystal orientation in peripheries were observed.

Example 8

Figure 6:
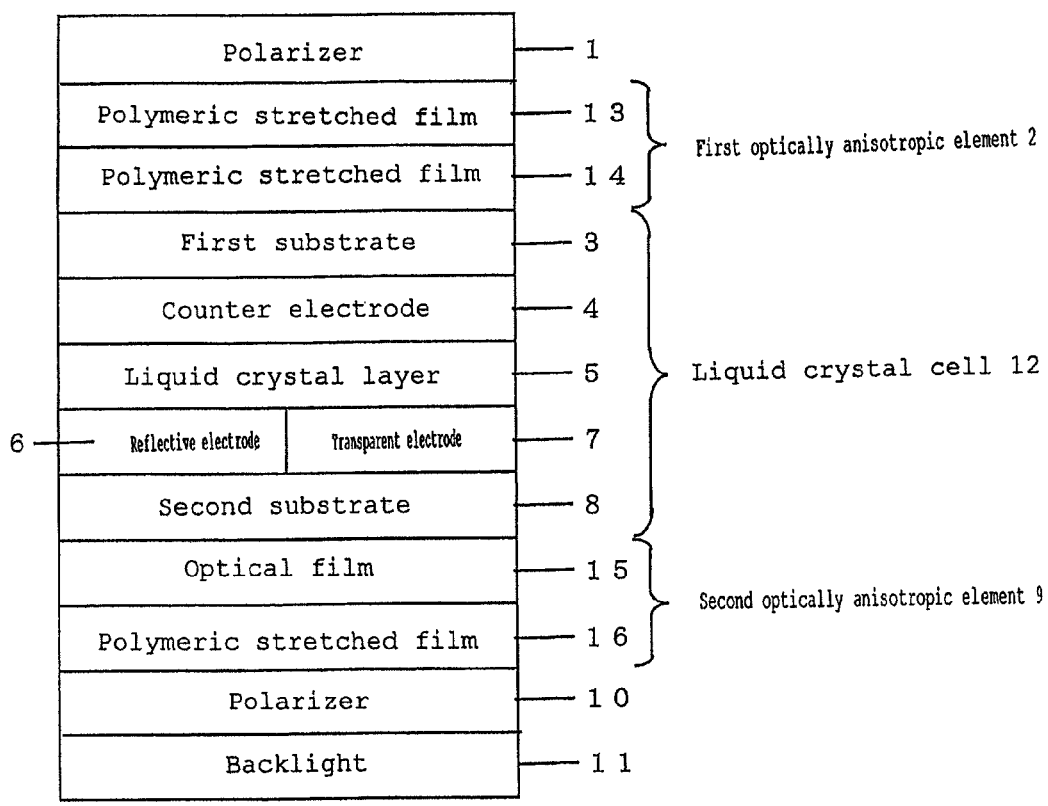
FIG. 6 is the conceptual view of the liquid crystal display device used in Example 8.

The layer structure of a transflective liquid crystal display device used in this example is shown in FIG. 6.

On a second substrate 8 are arranged a reflective electrode 6 formed of a highly reflective material such as Al and a transparent electrode 7 formed of a highly transparent material such as ITO while on a first substrate 3 is arranged a counter electrode 4. A liquid crystal layer 5 formed of a liquid crystalline material exhibiting a positive dielectric constant anisotropy is sandwiched between the reflective and transparent electrodes 6, 7 and the counter electrode 4. On the side of the first substrate 3, opposite to the side on which the counter electrode 4 is formed are arranged a first optically anisotropic element 2 and a polarizer 1 while on the side of the second substrate 8, opposite to the side on which the reflective and transparent electrodes 6, 7 are formed are arranged a second optically anisotropic element 9 and a polarizer 10. On the rear side of the polarizer 10 is arranged a backlight 11.

A liquid crystal film 15 ($\Delta$nd=120 nm) fixed in a nematic hybrid alignment wherein the average tile angle in the thickness direction is 28 degrees was produced in accordance with Example 2 and arranged as shown in FIG. 6.

The liquid crystal cell 12 used in this example was produced using ZLI-1695 (manufactured by Merck Ltd) as a liquid crystalline material. The liquid crystal layer thicknesses in the reflective electrode region 6 (reflective display part) and the transparent electrode region 7 (transmissive display part) were set to 2.4 µm and 4.8 µm, respectively. The pre-tilt angle of the liquid crystal layer at both of the substrate interfaces was 2 degrees. The $\Delta$nds of the liquid crystal cell in the reflective display part and transmissive display part are approximately 150 nm and 300 nm, respectively.

The polarizer 1 (thickness: about 180 μm, "SQW-862" manufactured by Sumitomo Chemical Industry Co., Ltd) was arranged on the viewer's side of the liquid crystal cell 12 (upper side of the drawing). Between the polarizer 1 and the liquid crystal cell 12 were arranged polymeric stretched films 13 (Δnd: about 268 nm) and 14 (Δnd: about 98 nm), each formed of a uniaxially stretched polycarbonate film, as the first optically anisotropic element 2.

On the rear side of the liquid crystal cell 12 as viewed from the observer were arranged the liquid crystal film 15 and a polymeric stretched film 16 (Δnd: about 272 nm) formed of a uniaxially stretched polycarbonate film, as the second optically anisotropic element 9. The polarizer 10 was arranged on the rear of the second optically anisotropic element 9.

Figure 7:
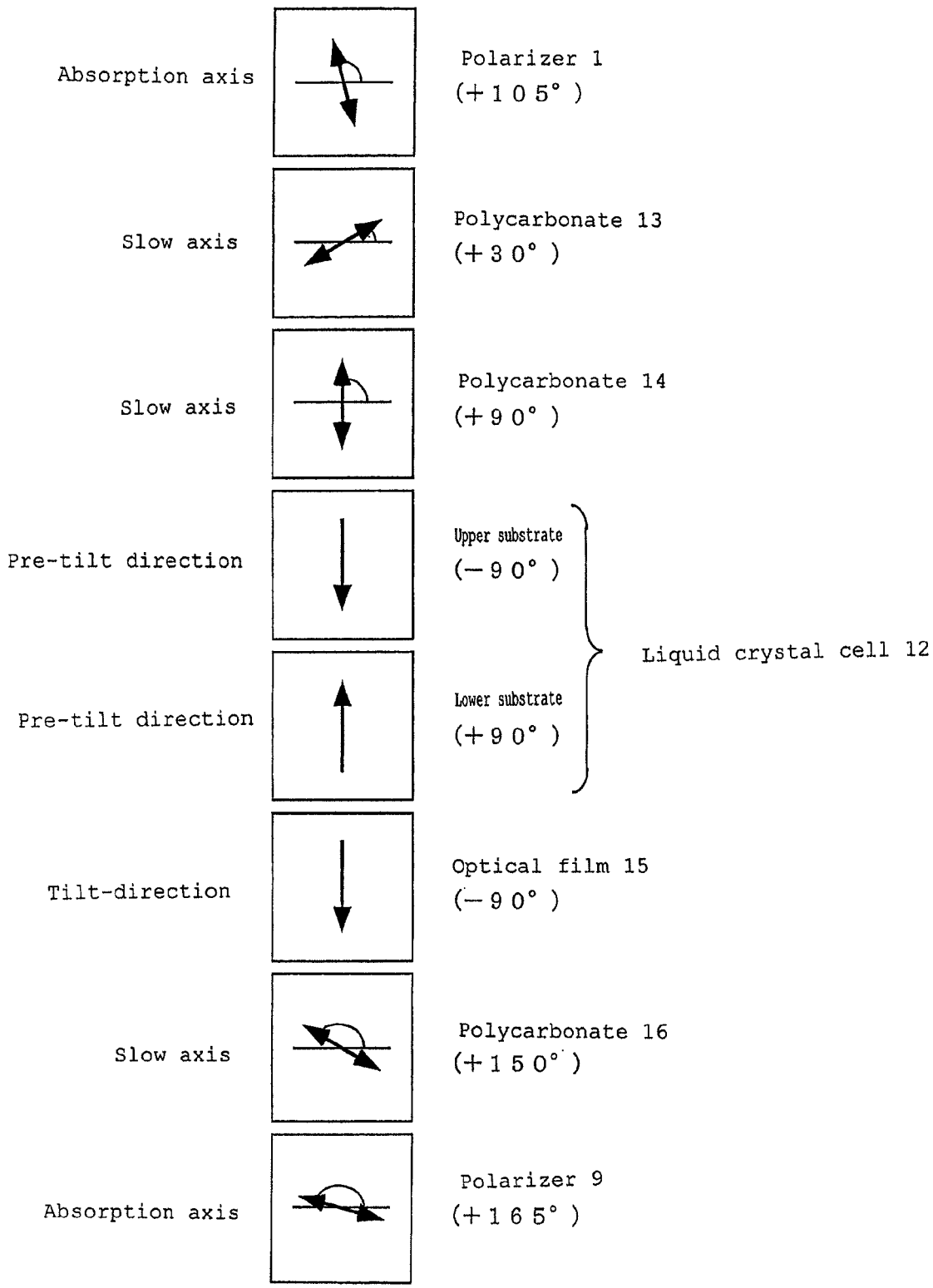
FIG. 7 is a view indicating the axial orientation of each layer of the liquid crystal display device used in Example 8.

The absorption axes of the polarizers 1, 10, the slow axes of the polymeric stretched films 13, 14 and 16, the pre-tilt direction of the cell 12 at both of the interfaces, and the tilt direction of the liquid crystal film 1 were oriented as shown in FIG. 7.

It was confirmed that the resulting liquid crystal display device has excellent viewing angle characteristics particularly in the transmissive mode.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A liquid crystalline composition comprising a (meth)acrylic compound having an oxetane group represented by any of formulas (1), (2) and (3), a liquid crystalline compound having an oxetane group, and a dioxetane compound represented by formula (5), the composition (mass ratio) of the compound having an oxetane group represented by any of formulas (1) to (3): the liquid crystalline compound having an oxetane group: the dioxetane compound represented by formula (5) being 1 to 30:100:0 to 40:

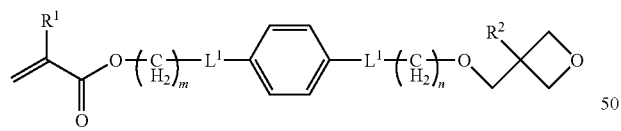
(1)

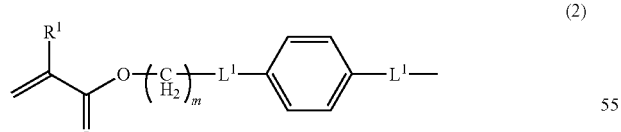
(2)

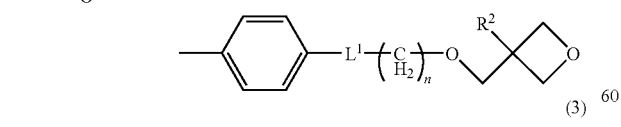
(3)

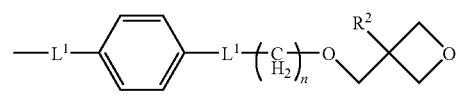

wherein each $R^1$ is hydrogen or methyl, each $R^2$ is hydrogen, methyl, or ethyl, each $L^1$ is a single bond, —O—, —O—CO— or —CO—O—, each m is an integer of 1 to 10, and each n is an integer of 0 to 10, and each n is an integer of 0 to 10,

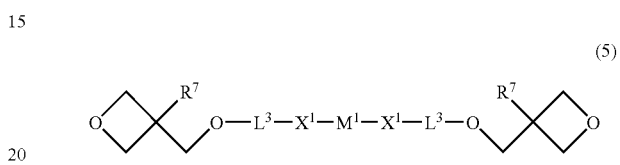
(5)

wherein each R7 is hydrogen, methyl, or ethyl, each L3 is —(CH2)n— wherein n is an integer of 1 to 12, each X1 is a single bond, —O—, —O—CO—, or —CO—O—, M1 is represented by formula (6) or (7) wherein each P1 is a group selected from those represented by formula (8) and P2 is a group selected from those represented by formula (9), and each L4 is a single bond, —CH=CH—, —C≡C—, —O—, —O—CO—, or —CO—O—

—P1-L4-P2-L4-P1— (6)

—P1-L4-P1— (7)

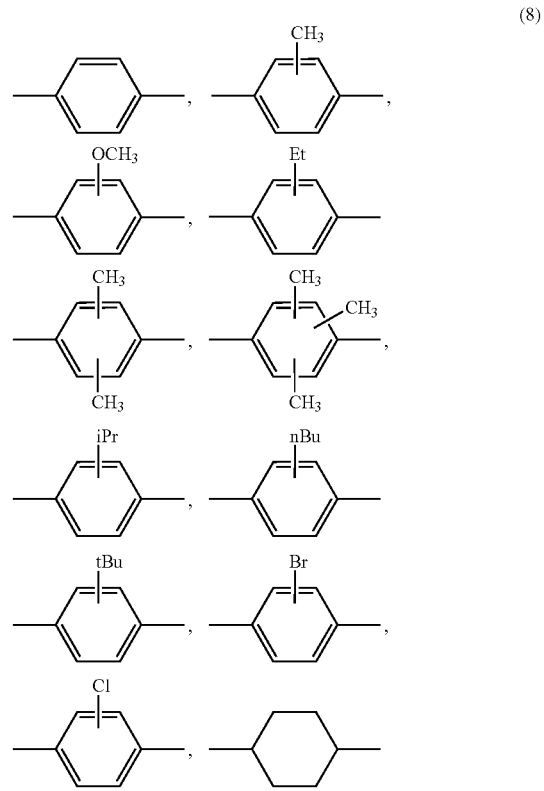
(8)

-continued (9)

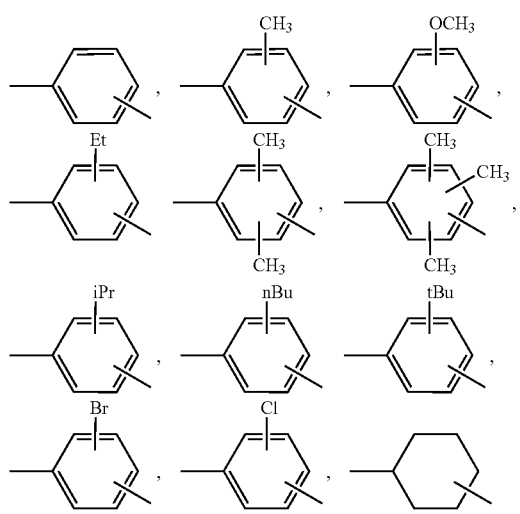

wherein Et, iPr, nBu, and tBu are each ethyl, isopropyl, n-butyl and tert-butyl, respectively.

2. The liquid crystalline composition according to claim 1, wherein the liquid crystalline compound having an oxetane group is a main chain liquid crystalline polymer.

3. The liquid crystalline composition according to claim 1, wherein the liquid crystalline compound having an oxetane group is a side chain liquid crystalline polymer.

4. The liquid crystalline composition according to claim 1, wherein the liquid crystalline compound having an oxetane group is a side chain liquid crystalline polymer represented by formula (4):

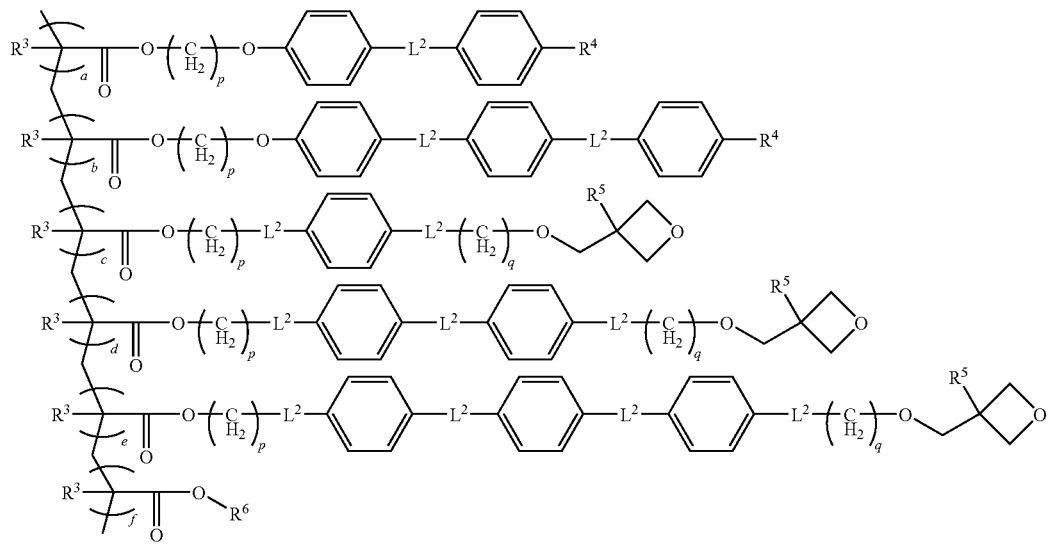

(4)

wherein each $R^3$ is hydrogen or methyl, each $R^4$ is hydrogen, methyl, ethyl, butyl, hexyl, octyl, nonyl, decyl, dodecyl, methoxy, ethoxy, propoxy, butoxy, pentyloxy, hexyloxy, heptyloxy, octyloxy, decyloxy, dodecyloxy, cyano, bromo, chloro, fluoro, or carboxyl, each $R^5$ is hydrogen, methyl, or ethyl, $R^6$ is a hydrocarbon group having 1 to 24 carbon atoms, each $L^2$ is a single bond, —O—, —O—CO—, —CO—O—, —CH=CH—, or —C≡C—, p is an integer of 1 to 10, q is an integer of 0 to 10, and a, b, c, d, e, and f are each a molar ratio of each unit in the polymer (a+b+c+d+e+f=1.0 provided that c+d+≠0).

5. The liquid crystalline composition according to claim 1, further comprising a photo cation generator and/or a thermal cation generator.

6. A liquid crystal film produced by aligning the liquid crystalline composition according to claim 1, and fixing the composition in the aligned state.

7. A liquid crystal film produced by extending the liquid crystalline composition according to claim 1, over an alignment substrate to be aligned and fixing the composition in the aligned state by photo irradiation and/or heat treatment.

8. A liquid crystal laminate produced by laminating the liquid crystal film according to claim 6, laminated via a tacky adhesive or adhesive over another film.

9. A liquid crystal laminate produced by transferring the liquid crystal film according to claim 6, via a tacky adhesive or adhesive over an optically transparent film.

10. The liquid crystal film laminate according to claim 8, wherein the tacky adhesive or adhesive is an acrylic tacky adhesive or adhesive.

11. The liquid crystal film according to claim 6, wherein the aligned state is obtained by fixing the composition in an aligned state selected from nematic, twisted nematic, cholesteric, and nematic hybrid orientations.

12. An optical film comprising the liquid crystal film according to claim 6.

13. The optical film according to claim 12, wherein the film is a retardation film, a color compensation film, a viewing angle improving film, a circular polarizing film, or an optical rotating film.

14. A liquid crystal display device equipped with the optical film according to claim 12.

* * * * *